(12) United States Patent
Tsuboi et al.

(10) Patent No.: US 11,245,575 B2
(45) Date of Patent: Feb. 8, 2022

(54) TERMINAL APPARATUS, BASE STATION APPARATUS, COMMUNICATION METHOD, AND INTEGRATED CIRCUIT

(71) Applicants: SHARP KABUSHIKI KAISHA, Sakai (JP); FG Innovation Company Limited, Tuen Mun (HK)

(72) Inventors: Hidekazu Tsuboi, Sakai (JP); Takako Hori, Sakai (JP); Shohei Yamada, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/957,700

(22) PCT Filed: Dec. 27, 2018

(86) PCT No.: PCT/JP2018/048358
§ 371 (c)(1),
(2) Date: Jun. 24, 2020

(87) PCT Pub. No.: WO2019/131962
PCT Pub. Date: Jul. 4, 2019

(65) Prior Publication Data
US 2020/0366552 A1 Nov. 19, 2020

(30) Foreign Application Priority Data
Dec. 28, 2017 (JP) .............................. JP2017-253554

(51) Int. Cl.
*H04L 12/24* (2006.01)
*H04W 28/02* (2009.01)
(Continued)

(52) U.S. Cl.
CPC ..... *H04L 41/0803* (2013.01); *H04W 28/0252* (2013.01); *H04W 72/04* (2013.01); *H04W 80/02* (2013.01); *H04W 88/06* (2013.01)

(58) Field of Classification Search
None
See application file for complete search history.

(56) References Cited

U.S. PATENT DOCUMENTS

2020/0229259 A1* 7/2020 Teyeb ............... H04W 76/19
2021/0136584 A1* 5/2021 Byun ............... H04W 4/40

FOREIGN PATENT DOCUMENTS

WO   WO2019/031947 A1   2/2019

OTHER PUBLICATIONS

NTT Docomo, Inc., "Bearer type change with PDPC version change", R2-1713838 3GPP TSG-RAN WG2 Meeting #100, Reno, USA, Nov. 27-Dec. 1, 2017.

(Continued)

Primary Examiner — Diane L Lo
(74) Attorney, Agent, or Firm — Imperium Patent Works

(57) ABSTRACT

To provide a terminal apparatus, a base station apparatus, a communication method, and an integrated circuit which are capable of efficient communication. The terminal apparatus includes a receiver configured to receive a message for adding a data radio bearer (DRB) including information of an EPS bearer identity, and a processing unit configured to notify to a NAS layer that the DRB indicated by the message is established and an EPS bearer identity of the established DRB in a case that the message does not include first information, and not to notify to the NAS layer that the DRB indicated by the message is established and an EPS bearer identity of the established DRB in a case that the message includes the first information.

4 Claims, 16 Drawing Sheets

(51) Int. Cl.
  *H04W 72/04* (2009.01)
  *H04W 80/02* (2009.01)
  *H04W 88/06* (2009.01)

(56) References Cited

OTHER PUBLICATIONS

LG Electronics Inc., "Consideration on PDCP version change in eLTE", R2-1713610 3GPP TSG-RAN2 Meeting RAN2 #100, Reno, Nevada, USA, Nov. 27-Dec. 1, 2017.
3GPP TS 37.324 V1.1.1 (Nov. 2017) 3rd Generation Partnership Project; Technical Specification Group Radio Access Network; E-UTRA and NR; Service Data Adaptation Protocol (SDAP) specification (Release 15).
3GPP TS 23.502 V15.0.0 (Dec. 2017) 3rd Generation Partnership Project; Technical Specification Group Services and System Aspects; Procedures for the 5G System; Stage 2 (Release 15).
ETSI TS 123 401 V14.3.0 (May 2017) LTE; General Packet Radio Service (GPRS) enhancements for Evolved Universal Terrestrial Radio Access Network (E-UTRAN) access (3GPP TS 23.401 version 14.3.0 Release 14).
3GPP TS 38.321 V0.0.3 (May 2017) 3rd Generation Partnership Project; Technical Specification Group Radio Access Network; NR; Medium Access Control (MAC) protocol specification (Release 15).
3GPP TS 38.322 V0.0.2(May 2017) 3rd Generation Partnership Project; Technical Specification Group Radio Access Network; NR; Radio Link Conlrol (RLC) protocol specification (Release 15).
3GPP TS 38.323 V0.0.5 (May 2017) 3rd Generation Partnership Project; Technical Specification Group Radio Access Network; NR; Packet Data Convergence Protocol (PDCP) specification (Release 15).
3GPP TS 38.331 V0.0.3 (May 2017) 3rd Generation Partnership Project; Technical Specification Group Radio Access Network; NR; Radio Resource Control (RRC); Protocol specification (Release 15).
3GPP TS 38.300 V0.4.1 (Jun. 2017) 3rd Generation Partnership Project; Technical Specification Group Radio Access Network; NR; NR and NG-RAN Overall Description; Stage 2 (Release 15).
3GPP TS 37.340 V0.1.1 (Jun. 2017) 3rd Generation Partnership Project; Technical Specification Group Radio Access Network; Evolved Universal Terrestrial Radio Access (E-UTRA) and NR; Multi-connectivity; Stage 2 (Release 15).
3GPP TS 36.321 V14.2.1 (Mar. 2017) 3rd Generation Partnership Project; Technical Specification Group Radio Access Network; Evolved Universal Terrestrial Radio Access (E-UTRA); Medium Access Conlrol (MAC) protocol specification (Release 14).
3GPP TS 36.322 V14.0.0 (Mar. 2017) 3rd Generation Partnership Project; Technical Specification Group Radio Access Network; Evolved Universal Terrestrial Radio Access (E-UTRA); Radio Link Conlrol (RLC) protocol specification (Release 14).
3GPP TS 36.323 V14.2.0 (Mar. 2017) 3rd Generation Partnership Project; Technical Specification Group Radio Access Network; Evolved Universal Terrestrial Radio Access (E-UTRA); Packet Data Convergence Protocol (PDCP) specification (Release 14).
3GPP TS 36.331 V14.2.2 (Apr. 2017) 3rd Generation Partnership Project; Technical Specification Group Radio Access Network; Evolved Universal Terrestrial Radio Access (E-UTRA); Radio Resource Control (RRC); Protocol specification (Release 14).
3GPP TS 36.300 V14.2.0 (Mar. 2017) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 23.501 V1.0.0 (Jun. 2017) 3rd Generation Partnership Project; Technical Specification Group Services and System Aspects; System Architecture for the 5G System; Stage 2 (Release 15).
NTT Docomo, Inc., "New WID on New Radio Access Technology", RP-170855, 3GPP TSG RAN Meeting #75, Dubrovnik, Croatia, Mar. 6-9, 2017.
NTT Docomo et al.: "Bearer type change with PDPC version change", 3GPP Draft; R2-1713838 3rd Generation Partnership Project (3GPP) Mobile Competence Centre; 650, Route des Lucioles; F-06921 Sophia-Antipolis Cedex, France; RAN WG2, Reno, USA, Nov. 17, 2017, XP051372485.
OPPO: "Discussion on PDCP version configuration", 3GPP Draft; R2-1707706 3rd Generation Partnership Project (3GPP) Mobile Competence Centre; 650, Route des Lucioles; F-06921 Sophia-Antipolis Cedex, France; RAN WG2, Berlin, Germany, Aug. 20, 2017, XP051317668 (4 pages).
Huawei: "Summary of 99#18 Bearer Type Change (Huawei)", 3GPP Draft; R2-1711090 3rd Generation Partnership Project (3GPP) Mobile Competence Centre; 650, Route des Lucioles; F-06921 Sophia-Antipolis Cedex, France; RAN WG2, Prague, Czech, Sep. 29, 2017, XP051355364 (32 pages).
Extended European Search Report dated Jul. 27, 2021 of the European Patent Office in foreign related application EP18895686.6 (11 pages).

* cited by examiner

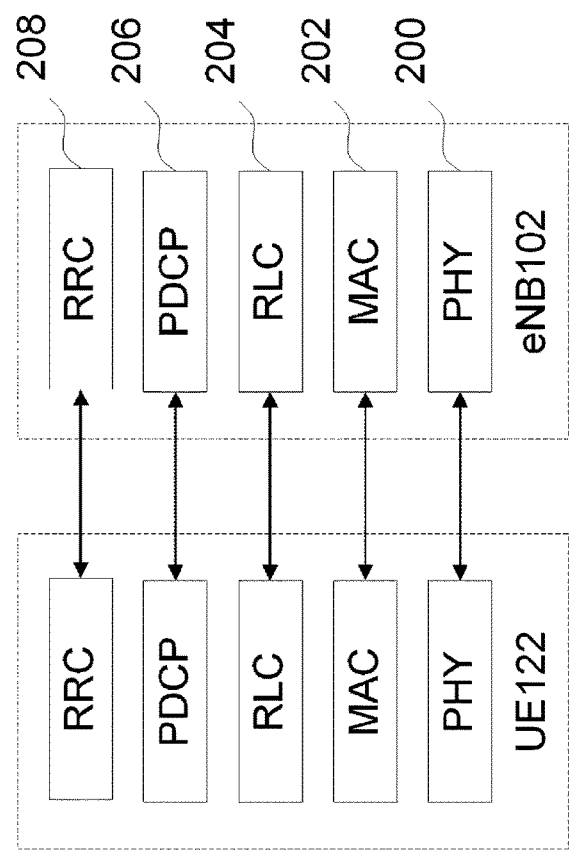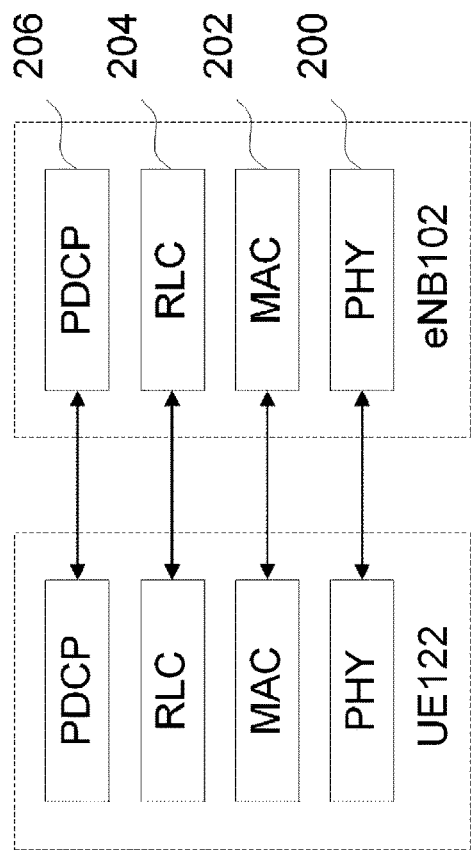
FIG. 2

```
<OMITTED>
fullConfig                    ENUMERATED {true},
<PARTLY OMITTED>
DRB-ToAddModList ::=          SEQUENCE (size (1..maxDRB)) OF DRB-ToAddMod
<PARTLY OMITTED>
DRB-ToAddMod ::= SEQUENCE {
    eps-BearerIdentity        INTEGER (0..15),
    drb-Identity              DRB-Identity,
    pdcp-Config               PDCP-Config,
    <PARTLY OMITTED>
}
<PARTLY OMITTED>
DRB-Identity ::=              INTEGER (1..32)
<PARTLY OMITTED>
DRB-ToReleaseList ::=         SEQUENCE (size (1..maxDRB)) OF DRB-Identity
<OMITTED>
```

FIG. 7

```
<OMITTED>
fullConfig                       ENUMERATED {true} ,
<PARTLY OMITTED>
DRB-ToAddModList ::=             SEQUENCE (size (1..maxDRB)) OF DRB-ToAddMod
<PARTLY OMITTED>
DRB-ToAddMod ::= SEQUENCE {
    cnAssociation                CHOICE {
        eps-BearerIdentity           INTEGER (0..15),
        sdap-Config                  SDAP-Config
        <PARTLY OMITTED>
    },
    drb-Identity                 DRB-Identity,
    pdcp-Config                  PDCP-Config,
    <PARTLY OMITTED>
}
<PARTLY OMITTED>
DRB-Identity ::=                 INTEGER (1..32)
<PARTLY OMITTED>
DRB-ToReleaseList ::=            SEQUENCE (size (1..maxDRB)) OF DRB-Identity
<OMITTED>
```

FIG. 8

```
<OMITTED>
RRCReconfiguration ::=    SEQUENCE {
    rrc-TransactionIdentifier    RRC-TransactionIdentifier,
    rrcReconfiguration           RRCReconfiguration-IEs,
    <PARTLY OMITTED>
}
<PARTLY OMITTED>
RRCReconfiguration-IEs ::=    SEQUENCE {
    radioBearerConfig    RadioBearerConfig,
    pdcpVersionChange    ENUMERATED {true},
    <PARTLY OMITTED>
}
<PARTLY OMITTED>
RadioBearerConfig ::=          SEQUENCE {
    drb-ToAddModList    DRB-ToAddModList,
    drb-ToReleaseList   DRB-ToReleaseList,
    securityConfig   SecurityConfig,
    <PARTLY OMITTED>
}
<OMITTED>
```

FIG. 11

```
    <OMITTED>
RRCReconfiguration ::=      SEQUENCE {
    rrc-TransactionIdentifier RRC-TransactionIdentifier,
    rrcReconfiguration          RRCReconfiguration-IEs,
    <PARTLY OMITTED>
}
    <PARTLY OMITTED>
RRCReconfiguration-IEs ::=   SEQUENCE {
    radioBearerConfig RadioBearerConfig,
    <PARTLY OMITTED>
}
    <PARTLY OMITTED>
RadioBearerConfig ::=       SEQUENCE {
    drb-ToAddModList    DRB-ToAddModList,
    drb-ToReleaseList DRB-ToReleaseList,
    securityConfig    SecurityConfig,
    <PARTLY OMITTED>
}
    <PARTLY OMITTED>
DRB-ToAddModList ::=    SEQUENCE (SIZE (1..maxDRB)) OF DRB-
ToAddMod
    <PARTLY OMITTED>
DRB-ToAddMod ::=        SEQUENCE {
    drb-Identity DRB-Identity,
    associateIndication    ENUMERATED{true},
    <PARTLY OMITTED>
}
    <PARTLY OMITTED>
DRB-ToReleaseList ::=    SEQUENCE (SIZE (1..maxDRB)) OF DRB-ToRelease
    <PARTLY OMITTED>
DRB-ToRelease ::=        SEQUENCE {
    drb-Identity DRB-Identity,
    releaseIndication  ENUMERATED{true},
    <PARTLY OMITTED>
}
    <OMITTED>
```

FIG. 14

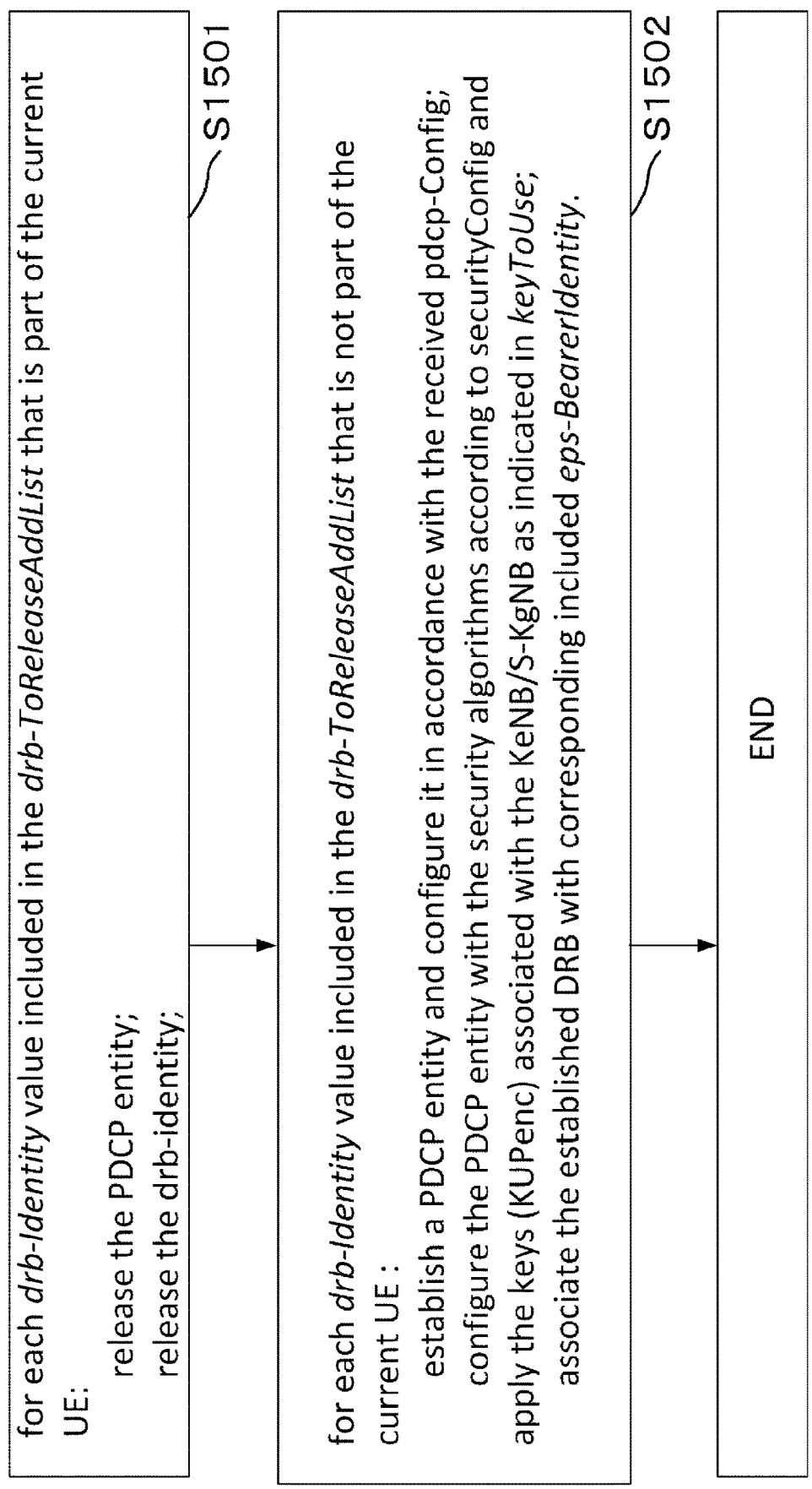

```
<OMITTED>
RRCReconfiguration ::=      SEQUENCE {
    rrc-TransactionIdentifier    RRC-TransactionIdentifier,
    rrcReconfiguration           RRCReconfiguration-IEs,
    <PARTLY OMITTED>
}
<PARTLY OMITTED>
RRCReconfiguration-IEs ::=    SEQUENCE {
    radioBearerConfig    RadioBearerConfig,
    <PARTLY OMITTED>
}
<PARTLY OMITTED>
RadioBearerConfig ::=        SEQUENCE {
    drb-ToAddModList         DRB-ToAddModList,
    drb-ToReleaseList        DRB-ToReleaseList,
    drb-ToReleaseAddList     DRB-ToReleaseAddList
    securityConfig         SecurityConfig,
    <PARTLY OMITTED>
}
DRB-ToReleaseAddList ::=  SEQUENCE (SIZE (1..maxDRB)) OF DRB-ToAddMod
<PARTLY OMITTED>
DRB-ToReleaseAdd ::=         SEQUENCE {
    eps-BearerIdentity        INTEGER (0..15),
    drb-Identity          DRB-Identity,
    pdcp-Config           PDCP-Config,
    <PARTLY OMITTED>
}
<OMITTED>
```

FIG. 16

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

BACKGROUND ART

A radio access method and a radio network for cellular mobile communications (which will hereinafter be referred to as "Long Term Evolution (LTE; trade name)" or "Evolved Universal Terrestrial Radio Access (EUTRA)") and a core network (which will be referred to as "Evolved Packet Core or EPC") have been studied by the 3rd Generation Partnership Project (3GPP).

Furthermore, as a radio access method and a radio network technology for a 5th-generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for a 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501, "System Architecture for the 5G System; Stage 2"
NPL 3: 3GPP TS 36.300, "Evolved Universal Terrestrial Radio Access (E-UTRA) and Evolved Universal Terrestrial Radio Access Network (E-UTRAN); Overall description; Stage 2"
NPL 4: 3GPP TS 36.331, "Evolved Universal Terrestrial Radio Access (E-UTRA); Radio Resource Control (RRC); Protocol specifications"
NPL 5: 3GPP TS 36.323, "Evolved Universal Terrestrial Radio Access (E-UTRA); Packet Data Convergence Protocol (PDCP) specification"
NPL 6: 3GPP TS 36.322, "Evolved Universal Terrestrial Radio Access (E-UTRA); Radio Link Control (RLC) protocol specification"
NPL 7: 3GPP TS 36.321, "Evolved Universal Terrestrial Radio Access (E-UTRA); Medium Access Control (MAC) protocol specification"
NPL 8: 3GPP TS 37.340, "Evolved Universal Terrestrial Radio Access (E-UTRA) and NR; Multi-Connectivity; Stage 2"
NPL 9: 3GPP TS 38.300, "NR; NR and NG-RAN Overall description; Stage 2"
NPL 10: 3GPP TS 38.331, "NR; Radio Resource Control (RRC); Protocol specifications"
NPL 11: 3GPP TS 38.323, "NR; Packet Data Convergence Protocol (PDCP) specification"
NPL 12: 3GPP TS 38.322, "NR; Radio Link Control (RLC) protocol specification"
NPL 13: 3GPP TS 38.321, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502, "Procedure for 5G System; Stage 2" NPL 16: 3GPP TS 37.324, "NR; Service Data Adaptation Protocol (SDAP) specification"

SUMMARY OF INVENTION

Technical Problem

As one of the technical studies of NR, a scheme called Multi-RAT Dual Connectivity (MR-DC) is being studied that allows cells of Radio Access Technologies (RATs) of both E-UTRA and NR to be made into cell groups for each RAT and to be allocated to UE such that a terminal apparatus communicates with one or more base station apparatuses (NPL 8).

However, since the formats and functions of the communication protocols used in the E-UTRA and the NR differ, there is a problem in that the protocol processing becomes complex compared to Dual Connectivity in conventional LTE using only E-UTRA as a RAT, and thus a base station apparatus and a terminal apparatus are not able to efficiently communicate with each other.

An aspect of the present invention has been made in light of the foregoing, and an object of the present invention is to provide a terminal apparatus, a base station apparatus, a communication method, and an integrated circuit which are capable of efficient communication.

Solution to Problem

In order to accomplish the object described above, an aspect of the present invention is contrived to provide the following means. An aspect of the present invention is a terminal apparatus for communicating with one or multiple base station apparatuses, the terminal apparatus including a receiver configured to receive a Radio Resource Control (RRC) reconfiguration message including a radio bearer configuration from a base station apparatus of the one or multiple base station apparatuses, and a processing unit configured to perform a radio bearer modification process based on whether or not the radio bearer configuration includes information indicating a Packet Data Convergence Protocol (PDCP) version change.

An aspect of the present invention is a base station apparatus for communicating with a terminal apparatus, the base station apparatus including a generation unit configured to generate a Radio Resource Control (RRC) reconfiguration message including a radio bearer configuration, and a transmitter configured to transmit the RRC reconfiguration message to the terminal apparatus, wherein the RRC reconfiguration message is a message causing the terminal apparatus to perform a radio bearer modification process based on whether or not the radio bearer configuration includes information indicating a Packet Data Convergence Protocol (PDCP) version change.

An aspect of the present invention is a communication method applied to a terminal apparatus communicating with one or multiple base station apparatuses, the communication method including the steps of receiving a Radio Resource Control (RRC) reconfiguration message including a radio bearer configuration from a base station apparatus of the one or multiple base station apparatuses, and performing a radio bearer modification process based on whether or not the radio bearer configuration includes information indicating a Packet Data Convergence Protocol (PDCP) version change.

An aspect of the present invention is a communication method applied to a base station apparatus for communicating with a terminal apparatus, the communication method including the steps of generating a Radio Resource Control (RRC) reconfiguration message including a radio bearer configuration, and transmitting the RRC reconfiguration message to the terminal apparatus, wherein the RRC reconfiguration message is a message causing the terminal apparatus to perform a radio bearer modification process based on whether or not the radio bearer configuration includes information indicating a Packet Data Convergence Protocol (PDCP) version change.

An aspect of the present invention is an integrated circuit mounted on a terminal apparatus for communicating with one or multiple base station apparatuses, the integrated circuit causing the terminal apparatus to perform receiving a Radio Resource Control (RRC) reconfiguration message including a radio bearer configuration from a base station apparatus of the one or multiple base station apparatuses, and performing a radio bearer modification process based on whether or not the radio bearer configuration includes information indicating a Packet Data Convergence Protocol (PDCP) version change.

An aspect of the present invention is an integrated circuit mounted on a base station apparatus for communicating with a terminal apparatus, the integrated circuit causing the base station apparatus to perform generating Radio Resource Control (RRC) reconfiguration message including a radio bearer configuration, and transmitting the RRC reconfiguration message to the terminal apparatus, wherein the RRC reconfiguration message is a message causing the terminal apparatus to perform a radio bearer modification process based on whether or not the radio bearer configuration includes information indicating a Packet Data Convergence Protocol (PDCP) version change.

Advantageous Effects of Invention

According to an aspect of the present invention, a base station apparatus can notify a terminal apparatus of an information required for a radio bearer configuration (e.g., DRB configuration) and the terminal apparatus can correctly perform the radio bearer configuration (e.g., DRB configuration), allowing efficient communication.

BRIEF DESCRIPTION OF DRAWINGS

FIG. 2 is a diagram of protocol stacks of a UP and a CP of a terminal apparatus and a base station apparatus in E-UTRA according to an embodiment of the present invention.

FIG. 7 illustrates an example of information related to a DRB configuration in LTE and a description of Abstract Syntax Notation One (ASN.1) of the information according to each embodiment of the present invention.

FIG. 8 illustrates an example of information related to a DRB configuration in NR and a description of Abstract Syntax Notation One (ASN.1) of the information according to each embodiment of the present invention.

FIG. 11 illustrates another example of the information related to the DRB configuration in NR and the description of Abstract Syntax Notation One (ASN.1) of the information according to an embodiment of the present invention.

FIG. 14 illustrates another example of the information related to the DRB configuration in NR and the description of Abstract Syntax Notation One (ASN.1) of the information according to an embodiment of the present invention.

FIG. 15 is another example of the processing method according to an embodiment of the present invention.

FIG. 16 illustrates another example of the information related to the DRB configuration in NR and the description of Abstract Syntax Notation One (ASN.1) of the information according to an embodiment of the present invention.

DESCRIPTION OF EMBODIMENTS

Hereinafter, an embodiment according to the present invention will be described with reference to the drawings.

LTE (and LTE-A Pro) and NR may be defined as RATs. The NR may be defined as a technology included in the LTE. The LTE may be defined as a technology included in the NR. The LTE capable of connecting with the NR through dual connectivity may be distinguished from conventional LTE. The present embodiment may be applied to NR, LTE and other RATs. Terms associated with the LTE and the NR are used in the following description. However, the present invention may be applied to other technologies using other terms.

Figure 1:
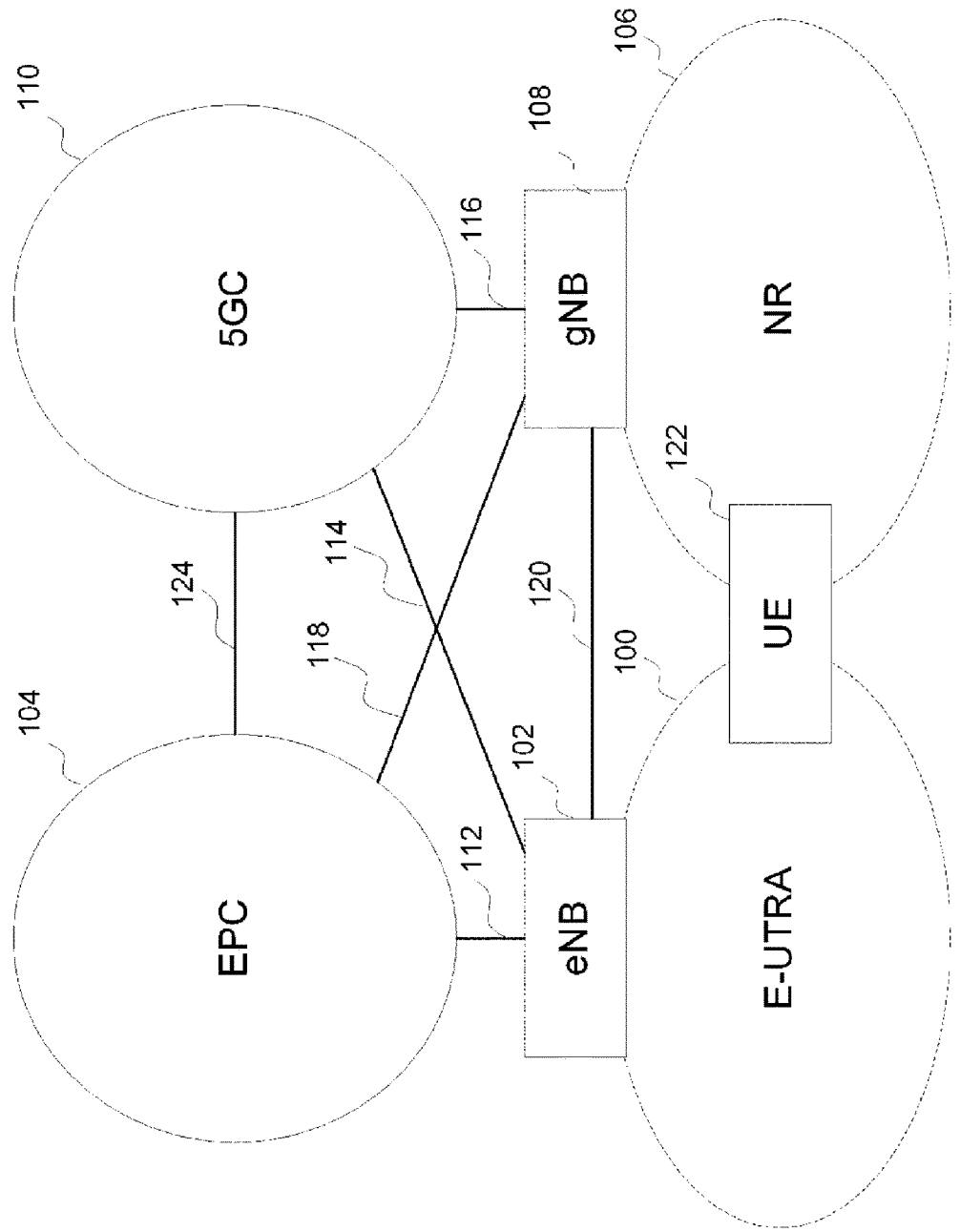
FIG. 1 is a schematic diagram of a communication system according to an embodiment of the present invention.

FIG. 1 is a schematic diagram of a communication system according to an embodiment of the present invention.

An E-UTRA 100 is a radio access technology described in NPL 3 or the like, and is constituted by a Cell Group (CG) including one or multiple frequency bands. An E-UTRAN Node B (eNB) 102 is a base station apparatus of E-UTRA. An Evolved Packet Core (EPC) 104 is a core network described in NPL 14 or the like and was designed as a core network for the E-UTRA. An interface 112 is an interface between the eNB 102 and the EPC 104, where there is a Control Plane (CP) through which control signals transfer and a User Plane (UP) through which user data transfers.

A NR 106 is a new radio access technology that is currently being studied by the 3GPP and includes Cell Groups (CGs) that are configured in one or multiple frequency bands. A gNode B (gNB) 108 is an NR base station apparatus. A 5GC 110 is a new core network for the NR that is currently being studied by 3GPP, and is described in NPL 2 and the like.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer CP only, or UP only, or both the CP and the UP, and details are being discussed by 3GPP. Furthermore, the interface 114, the interface 116, the interface 118, the interface 120, and the interface 124 may not exist depending on communication systems provided by network operators.

A UE 122 is a terminal apparatus supporting NR or both E-UTRA and NR.

FIG. 2 is a diagram of Protocol Stacks of the UP and the CP of the terminal apparatus and the base station apparatus in an E-UTRA radio access layer according to an embodiment of the present invention.

FIG. 2(A) is a diagram of a protocol stack of the UP used in a case that the UE 122 communicates with the eNB 102.

A Physical layer (PHY) 200 is a radio physical layer for providing a transmission service to a higher layer by using the Physical Channel. The PHY 200 is connected with a Medium Access Control layer (MAC) 202 that is a higher layer to be described below via Transport Channels. Data is exchanged between the MAC 202 and the PHY 200 via the transport channels. The data is transmitted and/or received via the radio physical channels between the PHYs of the UE 122 and the eNB 102.

The MAC 202 maps various Logical Channels to various transport channels. The MAC 202 is connected with a Radio Link Control layer (RLC) 204 which is a higher layer to be described below via logical channels. The logical channels are roughly classified depending on the type of transmitted information, specifically, classified into control channels transmitting control information and traffic channels transmitting user information. The MAC 202 has a function of controlling the PHY 200 in order to perform the Discontinuous Reception and Transmission (DRX and DTX), a function of performing a Random Access procedure, a function of reporting transmit power information, a function of performing HARQ control, and the like (NPL 7).

An RLC 204 divides (Segmentation) the data received from a Packet Data Convergence Protocol Layer (PDCP) 206 which is a higher layer to be described below, and adjusts the data size such that a lower layer can properly transmit data. Furthermore, the RLC 200 also has a function of ensuring Quality of Service (QoS) required for each piece of data. In other words, the RLC 204 has a function of data retransmission control or the like (NPL 6).

The PDCP 206 may have a header compression function of compressing unnecessary control information in order to efficiently transmit an IP Packet, which is user data, in a radio segment. Furthermore, the PDCP 206 may also have a data encryption function (NPL 5).

Note that data processed in the MAC 202, the RLC 204, and the PDCP 206 is referred to as a MAC Protocol Data Unit (PDU), an RLC PDU, and a PDCP PDU, respectively. Data transferred from the higher layer to the MAC 202, the RLC 204, and the PDCP 206 or data transferred to the higher layer are referred to as a MAC Service Data Unit (SDU), an RLC SDU, and a PDCP SDU, respectively.

FIG. 2B is a diagram of a protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of the CP. The RRC 208 configures and reconfigures Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Figure 3:
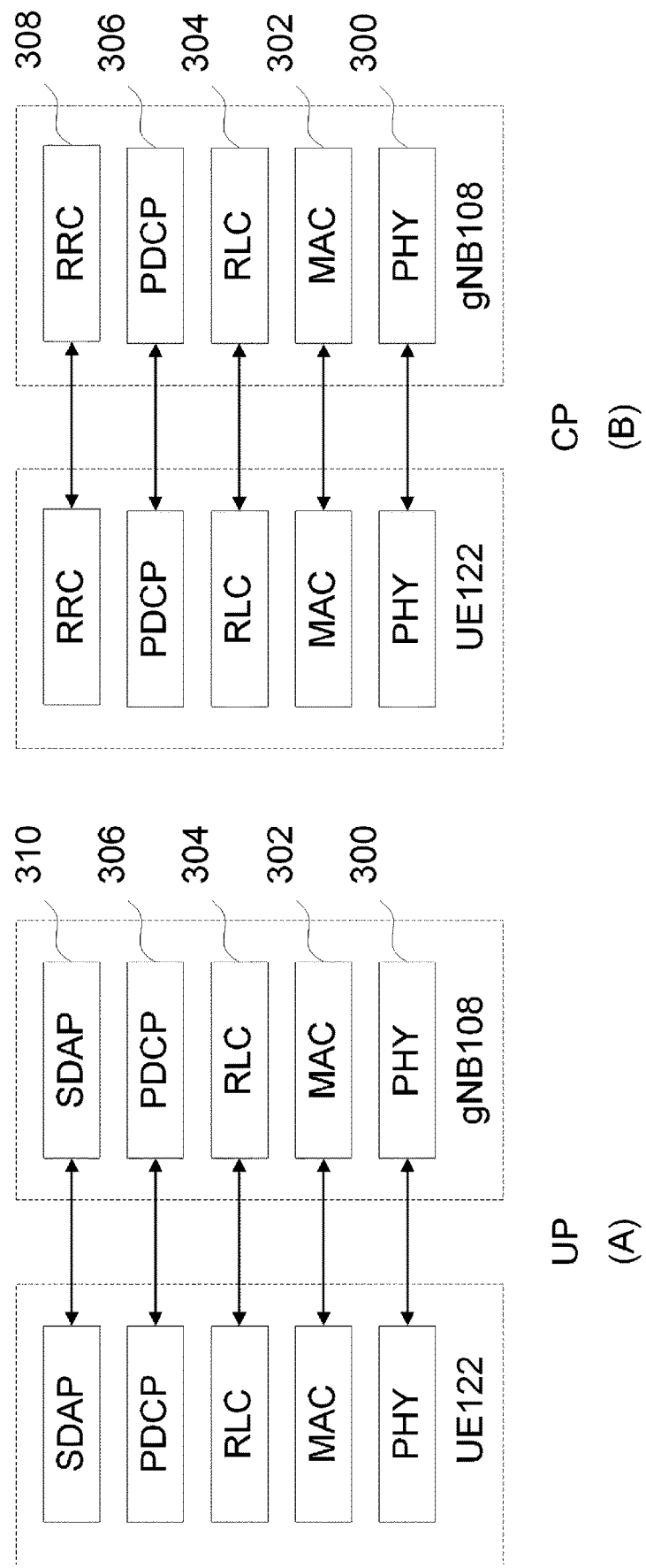
FIG. 3 is a diagram of protocol stacks of a UP and a CP of a terminal apparatus and a base station apparatus in NR according to an embodiment of the present invention.

FIG. 3 is a diagram of Protocol Stacks of the UP and the CP of the terminal apparatus and the base station apparatus in an NR radio access layer according to an embodiment of the present invention.

FIG. 3(A) is a diagram of a protocol stack of the UP used in a case that the UE 122 communicates with the gNB 108.

A Physical layer (PHY) 300 is a radio physical layer of the NR and may provide a transmission service to a higher layer by using the Physical Channel. The PHY 300 may be connected with the Medium Access Control layer (MAC) 302 which is a higher layer to be described below via the Transport Channels. Data may be exchanged between the MAC 302 and the PHY 300 via the transport channels. The data may be transmitted and/or received between the PHYs of the UE 122 and the gNB 108 via the radio physical channel. Details of the PHY 300 are different from those of the radio physical layer PHY 200 of E-UTRA and are under discussion by 3GPP.

The MAC 302 may map various Logical Channels to various transport channels. The MAC 302 may be connected with a Radio Link Control layer (RLC) 304 which is a high layer to be described below via the logical channels. The logical channels are roughly classified depending on the type of transmitted information, and may be classified into the control channels transmitting the control information and the traffic channels transmitting the user information. The MAC 302 may have a function of controlling the PHY 300 in order to perform the Discontinuous Reception and Transmission (DRX and DTX), a function of performing the Random Access procedure, a function of reporting the transmit power information, a function of performing the HARQ control, and the like (NPL 13). Details of the MAC 302 are different from those of the MAC 202 of the E-UTRA, and are under discussion by 3GPP.

The RLC 304 may divide (Segmentation) the data received from the Packet Data Convergence Protocol Layer (PDCP) 206 that is a higher layer to be described below, and adjust the data size such that the lower layer can properly transmit data. Furthermore, the RLC 304 may also have a function of ensuring Quality of Service (QoS) required for each piece of data. In other words, the RLC 304 may have a function of data retransmission control or the like (NPL 12). Details of the RLC 304 are different from those of the RLC 204 of the E-UTRA, and are under discussion by 3GPP.

A PDCP 306 may have a header compression function of compressing unnecessary control information in order to efficiently transmit an IP Packet, which is the user data, in a radio segment. Furthermore, the PDCP 306 may also have a data encryption function (NPL 11). Details of the PDCP 306 are different from those of the PDCP 206 of the E-UTRA, and are under discussion by 3GPP.

A Service Data Adaptation Protocol (SDAP) 310 may have a function to perform mapping of a DRB and a downlink QoS flow transmitted from the core network to the terminal apparatus via the base station apparatus and mapping of a DRB and an uplink QoS information flow transmitted from the terminal apparatus to the core network via the base station apparatus to store mapping rule information (NPL 16). The QoS flow includes one or multiple Service Data Flows (SDF) that are processed by the same QoS policy (NPL 2). The SDAP may have a function of a Reflective QoS to perform a mapping of the uplink QoS flow and the DRB, based on the information of the downlink QoS flow (NPL 2 and NPL 16). Details are under discussion by 3GPP.

Note that an IP layer, and a Transmission Control Protocol (TCP) layer, a User Datagram Protocol (UDP) layer, an application layer, and the like which are higher than the IP layer are higher layers than the SDAP (not illustrated). A layer associating the service data flow with the QoS flow in the SDAP of the terminal apparatus is also a higher layer than the SDAP.

Note that data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. Furthermore, data transferred from the higher layers to the MAC 202, the RLC 204, and the PDCP 206 or data transferred to the higher layer may be referred to as a MAC Service Data Unit (SDU), an RLC SDU, a PDCP SDU, and an SDAP SDU, respectively.

FIG. 3(B) is a diagram of a protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of the CP. The RRC 308 may configure and reconfigure Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 308 of the gNB 108 and the UE 122 (NPL 10).

The functional classification of the MAC 302, the RLC 304, the PDCP 306, the SDAP 310, and the RRC 308 described above is an example, and some or all of the respective functions may not be implemented. Some or all of the functions of each layer may be included in another layer.

Note that, according to the embodiment of the present invention, the MAC 202, the RLC 204, the PDCP 206, and the RRC 208 may be referred to as MAC for E-UTRA or MAC for LTE, RLC for E-UTRA or RLC for LTE, PDCP for E-UTRA or PDCP for LTE, and RRC for E-UTRA or RRC for LTE, respectively, to distinguish protocols of the E-UTRA and the NR hereinbelow. Furthermore, the MAC 302, the RLC 304, the PDCP 306, and the RRC 308 may also be referred to as MAC for NR, RLC for NR, RLC for NR, and RRC for NR, respectively. A space such as E-UTRA PDCP, or LTE PDCP and NR PDCP may be used for the description.

As illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2.

Figure 4:
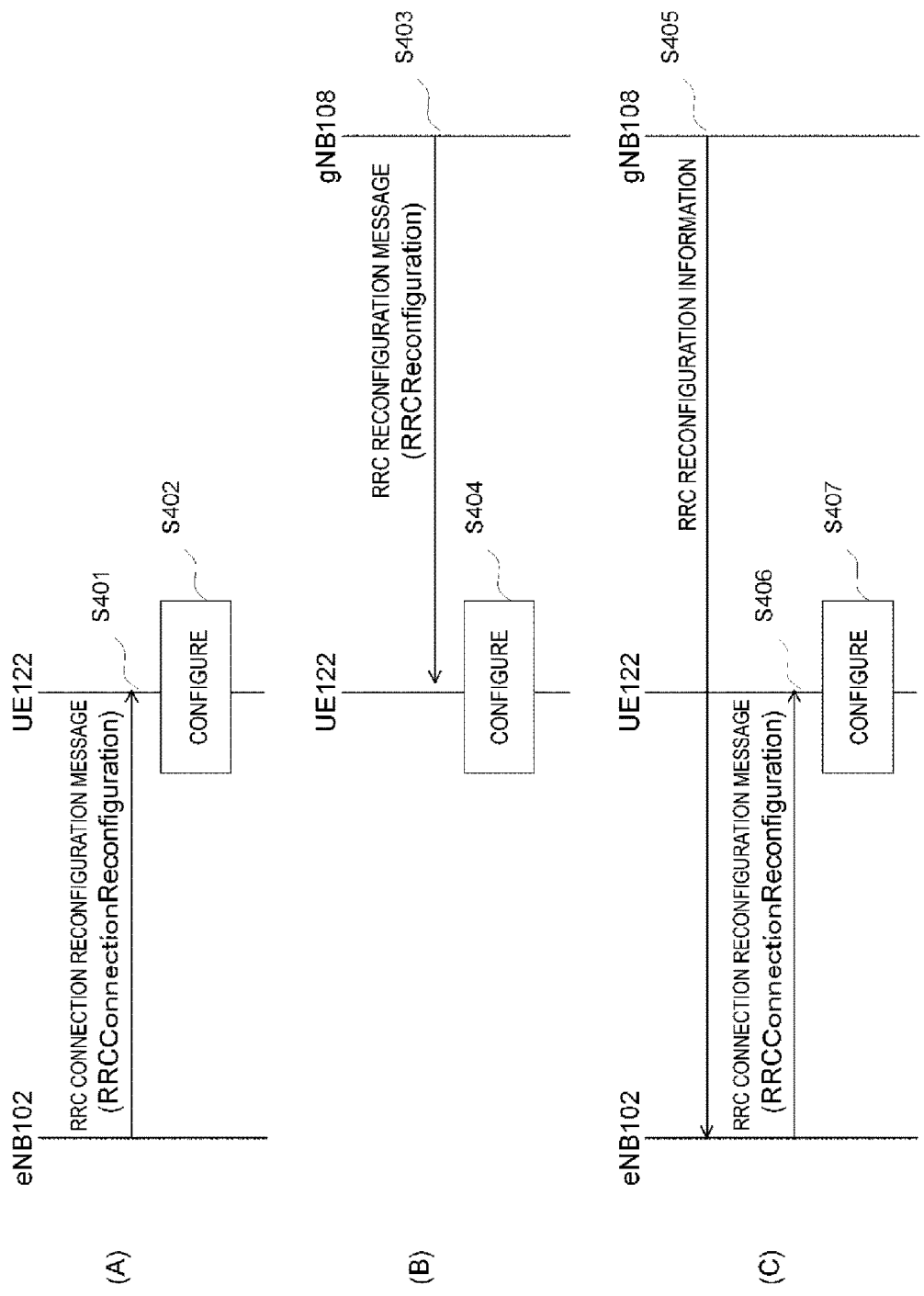
FIG. 4 is a diagram illustrating an example of a flow of an RRC connection reconfiguration procedure and/or an RRC reconfiguration procedure according to each embodiment of the present invention.

FIG. 4 is a diagram illustrating an example of a flow of an RRC connection reconfiguration procedure according to each embodiment of the present invention.

The RRC Connection Reconfiguration procedure is a procedure used for establishment, modification, and release of the RB, change and release of the secondary cell, and the like in LTE as described in NPL 4, and additionally, is used for handover and Measurement and the like. In MR-DC, particularly in E-UTRA-NR Dual Connectivity (EN-DC) that is MR-DC in a case that the core network is the EPC 104 and the master node is the eNB 102, and in NG-RAN E-UTRA-NR Dual Connectivity (NGEN-DC) that is MR-DC in a case that the core network is the 5GC 110 and the master node is the eNB 102, the RRC connection reconfiguration procedure may be used for some of establishment, modification, and release of the RB, change and release of the secondary cell, and the like in NR as described in NPL 10 besides LTE, and additionally, is used for some of handover and measurement (Measurement) and the like. In each embodiment of the present invention, the procedure used for establishment, modification, and release of the RB, addition, change, release, handover, and Measurement of the cell group, and the like in NR is referred to as the RRC connection reconfiguration procedure, but may be given another designation. The procedure used for establishment, modification, and release of the RB, addition, change, release, handover, and Measurement of the cell group, and the like according to the embodiment of the present invention may be a procedure in NR described in NPL 10, and may be referred to as the RRC reconfiguration procedure.

As illustrated in (A) of FIG. 4, in the RRC connection reconfiguration procedure, the UE 122 receives an RRC connection reconfiguration message (RRCConnectionReconfiguration) from the eNB 102 (step S401) and performs processes of various configurations such as a configuration of the DRB in accordance with information included in the RRC connection reconfiguration message (step S402). After step S402, the UE 122 may transmit an RRC connection reconfiguration complete message (RRCConnectionReconfigrationComplete) or the like to the eNB 102 (not illustrated).

The RRC Reconfiguration procedure is a procedure used for establishment, modification, and release of the RB, change and release of the secondary cell, and the like in NR as described in NPL 10, and additionally, is used for handover and Measurement and the like. In each embodiment of the present invention, the procedure used for establishment, modification, and release of the RB, addition, change, release, handover, and Measurement of the cell group, and the like in NR is referred to as the RRC reconfiguration procedure, but may be given another designation. The procedure used for establishment, modification, and release of the RB, addition, change, release, handover, and Measurement of the cell group, and the like according to the embodiment of the present invention may be a procedure in E-UTRA described in NPL 4, and may be referred to as the RRC connection reconfiguration procedure.

As illustrated in FIG. 4(B), in the RRC reconfiguration procedure, the UE 122 receives an RRC reconfiguration message (RRCReconfigration) from the gNB 108 (step S403) to perform various configurations such as a configuration of the DRB in accordance with information included in the RRC reconfiguration message (step S404). After step S404, the UE 122 may transmit an RRC reconfiguration complete message (RRCReconfigrationComplete) or the like to the gNB 108 (not illustrated).

As illustrated in FIG. 4(C), a part or all of information of the RRC reconfiguration message transmitted from the gNB 108 to the UE 122 may be notified to the eNB 102 (step S405), and the information may be transmitted, to the UE 122, while being included in the RRC connection reconfiguration message in the form of a container or the like transmitted from the eNB 102 to the UE 122 (step S406). The UE 122 performs processes of various configurations of the LTE RRC and the NR RRC such as a configuration of the DRB in accordance with the information included in the RRC connection reconfiguration message (step S407). After step S407, the UE 122 may transmit an RRC connection reconfiguration complete message (RRCConnectionReconfigrationComplete) or the like to the eNB 102 (not illustrated).

In a case that the eNB 102 has NR functionality (e.g., NR PDCP entity function, here), configuration information on NR (such as information on an NR PDCP entity configuration) may be transmitted, to the UE 122, while being included in the RRC connection reconfiguration message in the form of a container or the like transmitted from the eNB 102 to the UE 122. In a case that the configuration information on NR such as the information on the NR PDCP entity configuration is included in the RRC connection reconfiguration message in the form of a container or the like received from the eNB 102, the UE 122 decodes and configures the information in the NR RRC entity.

Figure 5:
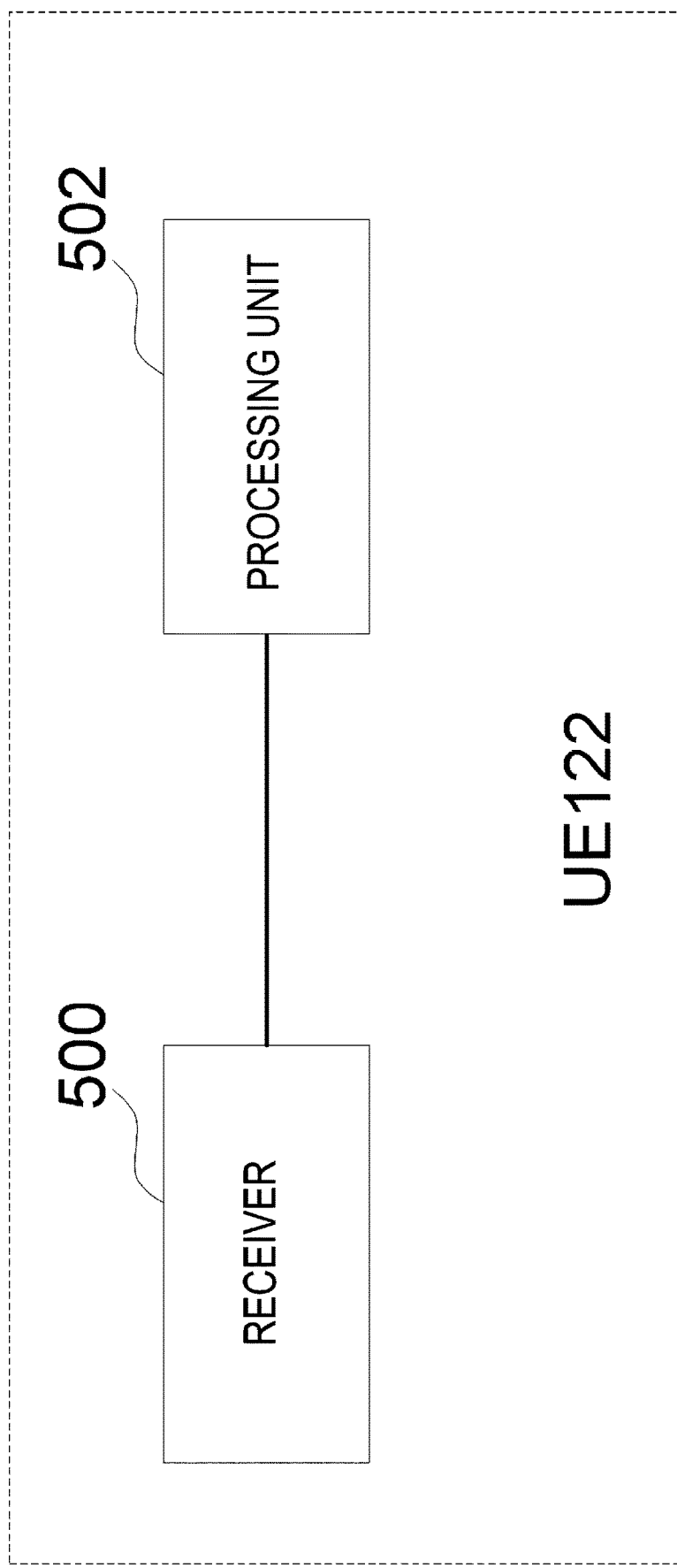
FIG. 5 is a block diagram illustrating a configuration of the terminal apparatus according to an embodiment of the present invention.

FIG. 5 is a block diagram illustrating a configuration of the terminal apparatus (UE 122) according to an embodiment of the present invention. Note that FIG. 5 illustrates only the main components closely related to the present invention in order to avoid complicated explanation.

The UE 122 illustrated in FIG. 5 includes a receiver 500 configured to receive an RRC reconfiguration message from the eNB 102 and/or the gNB 108, and a processing unit 502 configured to process the message.

Figure 6:
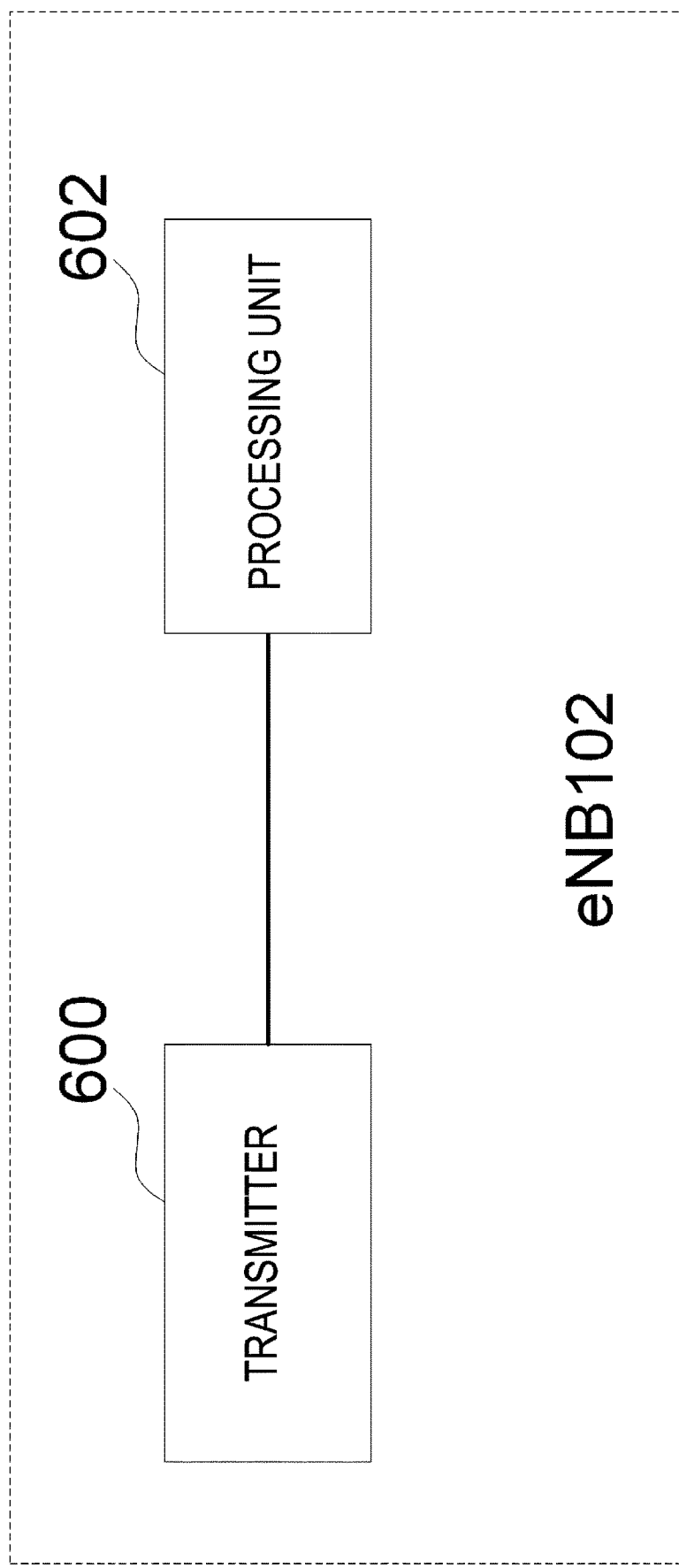
FIG. 6 is a block diagram illustrating a configuration of the base station apparatus according to an embodiment of the present invention.
Figure 9:
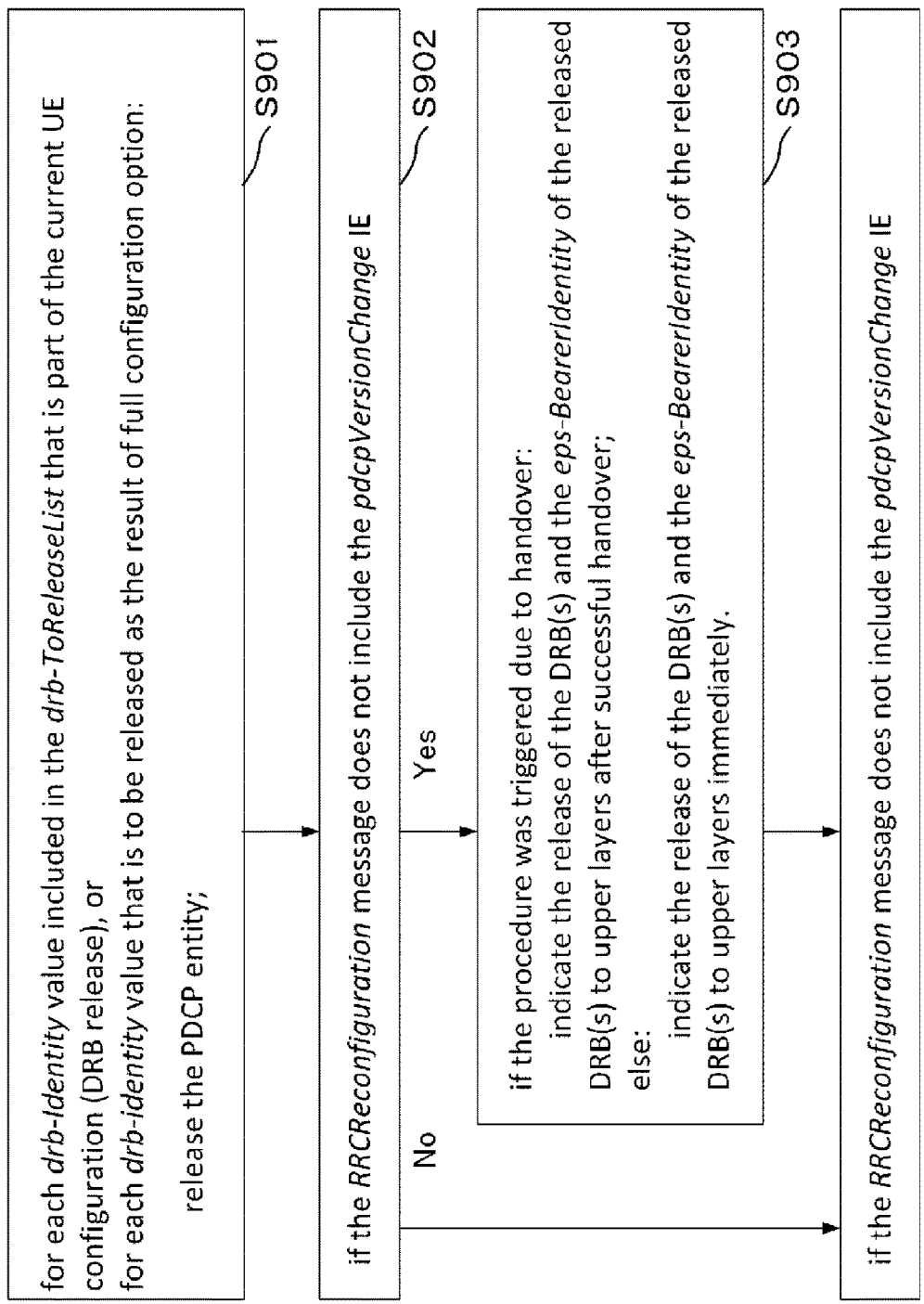
FIG. 9 is an example of a processing method according to an embodiment of the present invention.
Figure 10:
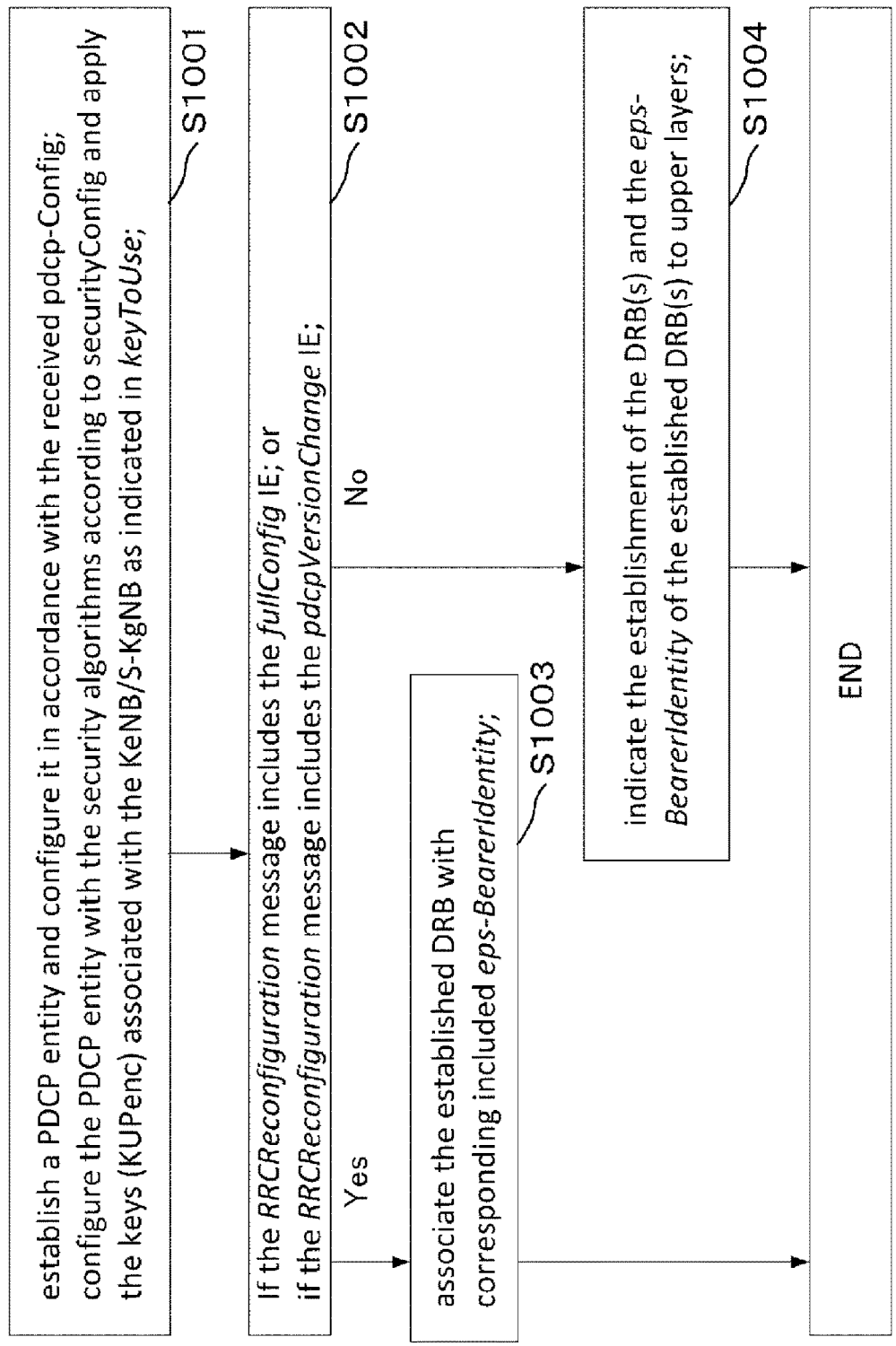
FIG. 10 is another example of the processing method according to an embodiment of the present invention.
Figure 12:
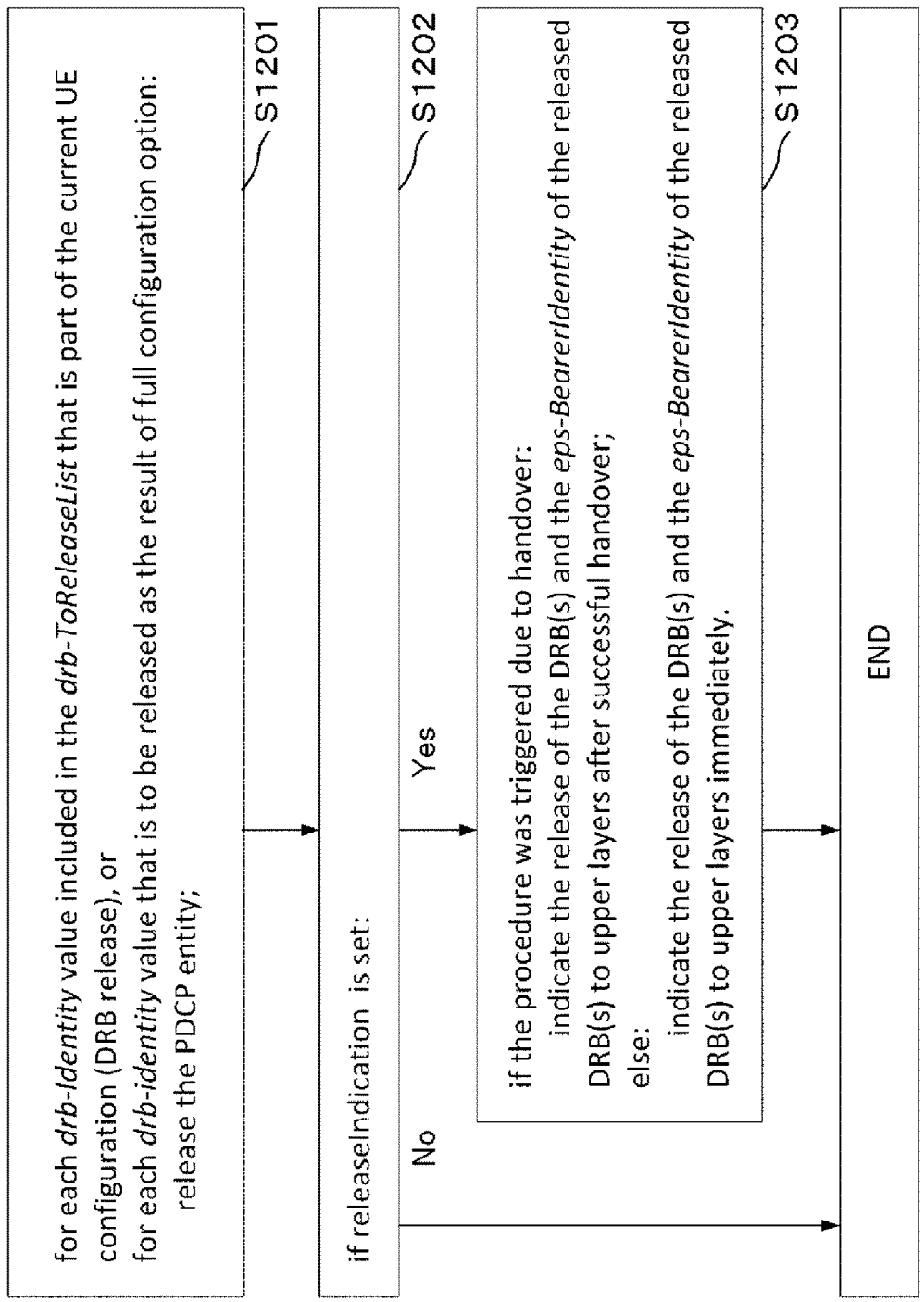
FIG. 12 is another example of the processing method according to an embodiment of the present invention.
Figure 13:
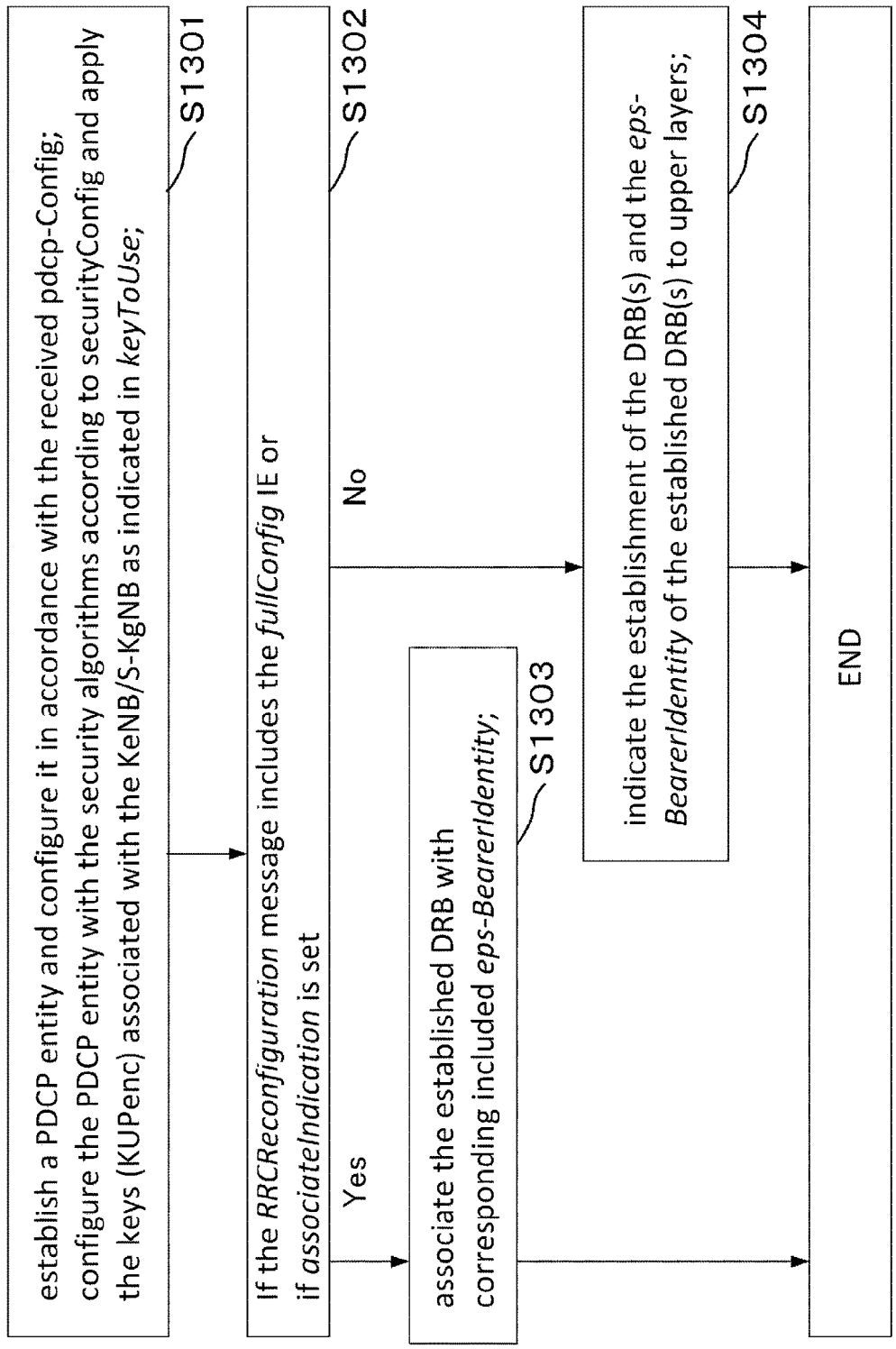
FIG. 13 is another example of the processing method according to an embodiment of the present invention.

FIG. 6 is a schematic block diagram illustrating a configuration of the base station apparatus (eNB 102) according to the embodiment of the present invention. Note that FIG. 6 illustrates only the main components closely related to the present invention in order to avoid complicated explanation.

The eNB 102 illustrated in FIG. 6 includes a transmitter 600 configured to transmit an RRC connection reconfiguration message to the UE 122, and a processing unit 602 configured to process the message.

Note that the configuration of the gNB 108 may be similar to that of the eNB 102 illustrated in FIG. 6. In this case, the gNB 108 is configured to include a transmitter 600 configured to transmit an RRC reconfiguration message to the UE 122, and a processing unit 602 configured to process the message.

FIG. 7 illustrates an example of information related to LTE and a description of Abstract Syntax Notation One (ASN.1) of the information in the DRB configurations in the cell group of the master node in the EN-DC and the NGEN-DC among the information included in the RRC connection reconfiguration message illustrated in FIG. 4, in each embodiment of the present invention. In the 3GPP, the specifications related to the RRC (NPL 4 and NPL 10) describe messages, information (Information Element or IE), and the like related to the RRC by use of ASN.1. In the following description, in an example of the ASN.1, "omitted" and "partly omitted" indicate that not the ASN.1 description partially but other information is omitted. Note that there may also be omitted information in a part where neither <omitted> nor <partly omitted> is indicated. In the following description, the example of the ASN.1 does not correctly comply with the ASN.1 scheme, but describes an example of a parameter of the DRB configuration according to the embodiment of the present invention, and other names and other notations may be used. Moreover, the example of the ASN.1 in the following description illustrates only an example about the main information closely related to the present invention in order to avoid complicated explanation. In the example of the ASN.1 in the following description, an order of information elements and the like is also an example, and is not limited to the example here.

An EPS bearer used in the description below uniquely identifies a traffic flow that is handled a QoS common between UE 122 and the EPC 104, and an EPS bearer identity is an identifier used to identify each EPS bearer.

Information represented by fullConfig in FIG. 7 is information indicating that a full configuration is applied, and true, enable, and the like may be used to indicate that a full configuration is applied. Information represented by DRB-ToAddModList may be a list of information indicating the configuration of the DRB to be added or modified that is represented by DRBToAddMod. Information represented by eps-BearerIdentity in DRB-ToAddMod (information indicating the configuration of the DRB to be added or modified) may be information of the EPS bearer identity that identifies the EPS bearer described in NPL 3. In the example of FIG. 7, the information of the EPS bearer identity is an integer value from 0 to 15, but may be another value. The information of the EPS bearer identity may correspond to the configured DRB in a one-to-one manner. In the information indicating the configuration of the DRB to be added or modified, information represented by DRB-Identity is information of a DRB identity of the DRB to be added or modified. In the example of FIG. 7, the information of the DRB identity is an integer value from 1 to 32 is used, but may be another value. In the information indicating the configuration of the DRB to be added or modified, information represented by pdcp-Config may be information related to a configuration of an LTE PDCP entity for establishing and modifying the PDCP 206. Information indicated by DRB-ToReleaseList may be information indicating a list of DRB identities of the DRBs to be released.

Also, some or all pieces of the information illustrated in FIG. 7 may be optional. Specifically, the information illustrated in FIG. 7 may be included in the RRC connection reconfiguration message as necessary. For example, in a case that the LTE PDCP is used as the PDCP for the DRB in the UE 122 corresponding to the EN-DC, the information related to the configuration of the LTE PDCP entity may be included, or in a case that the NR PDCP is used, the information related to the configuration of the LTE PDCP entity may not be included.

Note that in the UE 122, the configuration of the PDCP entity is configured by the corresponding RRC entity. In other words, the configuration of the LTE PDCP entity is configured by an LTE RRC entity described in NPL 4, and the configuration of the NR PDCP entity is configured by an NR RRC entity described in NPL 10. In a process performed in the LTE RRC entity, whether the LTE PDCP is established or configured is determined, and in a process performed in the NR RRC entity, whether the NR PDCP is established or configured is determined. Note that in the case that the configuration information on NR such as the information on the NR PDCP entity configuration is included in the RRC connection reconfiguration message in the form of a container or the like received from the eNB 102, the UE 122 decodes and configures the information in the NR RRC entity.

FIG. 8 illustrates an example of information related to the DRB configuration and a description of Abstract Syntax Notation One (ASN.1) of the information among the information included in the RRC reconfiguration message illustrated in FIG. 4. Furthermore, the example of the ASN.1 illustrated in FIG. 8 does not correctly comply with the ASN.1 scheme, but describes an example of a parameter of the DRB configuration according to the present invention, and other names and other notations may be used.

Information represented by fullConfig in FIG. 8 is information indicating that a full configuration is applied, and true, enable, and the like may be used to indicate that a full configuration is applied. Information represented by DRB-ToAddModList may be a list of information indicating the configuration of the DRB to be added or modified that is represented by DRBToAddMod (that is information indicating the configuration of the DRB to be added or modified). In DRB-ToAddMod, information represented by eps-BearerIdentity may be information of the EPS bearer identity that identifies the EPS bearer described in NPL 3. In the example of FIG. 8, the information of the EPS bearer identity is an integer value from 0 to 15, but may be another value. Information represented by sdap-Config in DRB-ToAddMod may be configuration information of the SDAP. Either eps-BearerIdentity or sdap-Config may be configured. For example, in a case that the UE 122 is connected to the EPC 104, the DRB may be associated with eps-BearerIdentity. In a case that the UE 122 is connected to the 5GC 110, the DRB may be associated with the sdap-Config. In the information indicating the configuration of the DRB to be added or modified, information represented by DRB-Identity is a DRB identity of the DRB to be added or modified. In the example of FIG. 8, the information of the DRB identity is an integer value from 1 to 32 is used, but may be another value. The DRB identity may be used to uniquely identify the DRB in the PDU session.

Information indicated by DRB-ToReleaseList may be information indicating a list of DRB identities of the DRBs to be released.

Also, some or all pieces of the information illustrated in FIG. 8 may be optional. Specifically, the information illustrated in FIG. 8 may be included in the RRC reconfiguration message as necessary. For example, in a case that the NR PDCP is used as the PDCP for the DRB in the UE 122 corresponding to the EN-DC, the information related to the configuration of the NR PDCP entity may be included, or in a case that the LTE PDCP is used, the information related to the configuration of the NR PDCP entity may not be included.

Note that in the UE 122, the configuration of the PDCP entity is configured by the corresponding RRC entity. In other words, the configuration of the LTE PDCP entity is configured by an LTE RRC entity described in NPL 4, and the configuration of the NR PDCP entity is configured by an NR RRC entity described in NPL 10. In a process performed in the LTE RRC entity, whether the LTE PDCP is established or configured is determined, and in a process performed in the NR RRC entity, whether the NR PDCP is established or configured is determined. Note that in the case that the configuration information on LTE such as the information on the configuration of the LTE PDCP entity is included in the RRC reconfiguration message in the form of a container or the like received from the gNB 108, the UE 122 decodes and configures the information in the LTE RRC entity.

Note that hereinafter, in the present embodiment, the information indicating the configuration of the DRB to be added or modified may be referred to as the DRB configuration, the information of the EPS bearer identity may be referred to as the EPS bearer identity, the information of the DRB identity may be referred to as the DRB identity, the information on the configuration of the LTE PDCP entity may be referred to as the LTE PDCP configuration, and the information on the configuration of the NR PDCP entity may be referred to as the NR PDCP configuration.

Note that in the following description, the DRB configuration is included in the list of the DRB configurations, and the process for the DRB configuration by the processing unit 502 in the UE 122 is performed for each of the DRB configurations included in the list of the DRB configurations.

An example of a DRB configuration procedure will be described with reference to FIGS. 5 to 8, FIG. 9, and FIG. 11. Here, a process in a case that the UE 122 receives information indicating that the DRB is to be released (e.g., DRB-ToReleaseList) will be described. Note that other processes not included in the following description may be included in the DRB configuration procedure. Here, the procedure in FIG. 9 will be described with reference to the RRC reconfiguration message in FIG. 11 as an example, but a structure and name of a message or information element are not limited thereto.

The processing unit 502 in the UE 122 releases the PDCP entity associated with the value of the DRB identity included in DRB-ToReleaseList that is part of the current UE 122 configuration, releases the PDCP entity associated with the value of the DRB identity to be released as a result of the full configuration, and proceeds to step S902 (step S901).

In a case that the RRC reconfiguration message including the DRB-ToReleaseList in step S901 includes information indicating a PDCP version change (e.g., PDCP version change information element: pdcpVersionChange), the processing unit 502 in the UE 122 terminates the DRB configuration (release of the DRB) process. At this time, the DRB identity may be released. In a case that the RRC reconfiguration message including the DRB-ToReleaseList in step S901 does not include information indicating the PDCP version change (e.g., PDCP version change information element: pdcpVersionChange), the processing unit 502 in the UE 122 proceeds to step S903 (step S902). Note that the information indicating the PDCP version change may include information on one or multiple DRB identities or EPS bearer identities that perform the PDCP version change. In this case, in the DRB (release of the DRB) process on the identifier information, the process may be terminated in step S901.

In a case that this procedure is triggered due to handover (RRC reconfiguration with synchronization), the processing unit 502 in the UE 122 indicates that the DRB identified by the DRB identity is released (DRB release information) and the EPS bearer identity of the released DRB to the higher layer of the UE 122 (e.g., Non-Access Stratum (NAS Layer)) after the handover (RRC reconfiguration with synchronization) succeeds, and then, terminates the DRB configuration (release of the DRB) process. In a case that this procedure is not triggered due to handover (RRC reconfiguration with synchronization), the processing unit 502 in the UE 122 immediately indicates that the DRB identified by the DRB identity is released and the EPS bearer identity of the released DRB to the higher layer of the UE 122 (e.g., Non-Access Stratum (NAS Layer)), and then, terminates the DRB configuration (release of the DRB) process (step S903).

Note that the above description describes the example in which the information indicating the PDCP version change (e.g., PDCP version change information element (pdcpVersionChange)) is included in the RRC reconfiguration message, but a structure in which DRB-ToReleaseList can include multiple parameters may be adopted. For example, in the structure in which DRB-ToReleaseList includes multiple DRB-ToRelease information elements, DRB-ToRelease may include the identifier information of the DRB to be released and corresponding pdcpVersionChange information.

The information indicating the PDCP version changes (e.g., PDCP version change information element: pdcpVersionChange) may be Boolean type information, indicating a PDCP version change if true, or a non PDCP version change if false. Alternatively, true and false may be reversed. The information indicating the PDCP version change (e.g., PDCP version change information element: pdcpVersionChange) may be Enumerated type information, indicating a PDCP version change in a case that the information is a first value, or a non PDCP version change in a case that the information is a second value. The information indicating the PDCP version change (e.g., PDCP version change information element: pdcpVersionChange) may indicate a PDCP version change or a non PDCP version change depending on whether or not first information is included in the RRC reconfiguration message. A case that the first information is included may indicate a PDCP version change, and a case that the first information is not included may indicate a non PDCP version change. Alternatively, whether or not the first information is included may be reversed. The information indicating the PDCP version change (e.g., PDCP version change information element: pdcpVersionChange) may be other types.

Another example of the DRB configuration procedure will be described using FIGS. 5 to 8, FIG. 10, and FIG. 11. Here, a process in a case that the UE 122 receives information indicating that the DRB is added and/or modified (e.g., DRB-ToAddModList) will be described. Here, the procedure in FIG. 10 will be described with reference to the RRC reconfiguration message in FIG. 11 as an example, but a structure and name of a message or information element are not limited thereto.

The processing unit 502 in the UE 122 performs the following processes on the value of the DRB identity included in DRB-ToAddModList that is not part of the current UE 122 configuration.

The processing unit 502 in the UE 122 establishes a PDCP entity and configures the PDCP entity according to the received pdcp-Config. A security algorithm is configured for the PDCP entity according to a configuration for security (securityConfig). Keys associated with KeNB or KgNB indicated by information of the key to be used (keyToUse) are applied, and the process proceeds to step S1002 (step S1001).

In step S1002, in a case that the fullConfig information element is included in the RRC reconfiguration message, or the pdcpVersionChange information element is included in the RRC reconfiguration message, the processing unit 502 in the UE 122 proceeds to step S1003 and otherwise to step S1004 (step S1002).

In step S1003, the processing unit 502 in the UE 122 associates the established DRB with the EPS bearer identity included in the configuration of the DRB, and then, terminates the DRB configuration (addition and/or modification of the DRB) process (step S1003).

In step S1004, the processing unit 502 in the UE 122 indicates that the DRB identified by the DRB identity is established and the EPS bearer identity of the established DRB to the higher layer of the UE 122 (e.g., Non-Access Stratum (NAS Layer)), and then, terminates the DRB configuration (addition and/or modification of the DRB) process (step S1004).

Note that the above description describes the example in which the information indicating the PDCP version change (e.g., PDCP version change information element (pdcpVersionChange)) is included in the RRC reconfiguration message, but a structure in which DRB-ToAddModList can include that information may be adopted. For example, DRB-ToAddMod may include the DRB identity information to be added and corresponding pdcpVersionChange information.

The information indicating the PDCP version changes (e.g., PDCP version change information element: pdcpVersionChange) may be Boolean type information, indicating a PDCP version change if true, or a non PDCP version change if false. Alternatively, true and false may be reversed. The information indicating the PDCP version change (e.g., PDCP version change information element: pdcpVersionChange) may be Enumerated type information, indicating a PDCP version change in a case that the information is a first value, or a non PDCP version change in a case that the information is a second value. The information indicating the PDCP version change (e.g., PDCP version change information element: pdcpVersionChange) may indicate a PDCP version change or a non PDCP version change depending on whether or not first information is included in the RRC reconfiguration message. A case that the first information is included may indicate a PDCP version change, and a case that the first information is not included may indicate a non PDCP version change. Alternatively, whether or not the first information is included may be reversed. The information indicating the PDCP version change (e.g., PDCP version change information element: pdcpVersionChange) may be other types. The process may consider "indicating the PDCP version change" as "indicating that a full configuration is configured" or "indicating that a full configuration is performed."

The information indicating the PDCP version change may be other information. For example, the information may be replaced with information indicating that the DRB is added after the DRB is released, or may be information indicating that the EPS bearer is maintained. The information indicating the PDCP version change may be information indicating that the DRB corresponding to the EPS bearer is to be released and added while maintaining the EPS bearer, which may be information having other names.

Another example of the DRB configuration procedure will be described using FIGS. 5 to 8, FIG. 12, and FIG. 14. Here, a process in a case that the UE 122 receives information indicating that the DRB is to be released (e.g., DRB-ToReleaseList) will be described. Note that other processes not included in the following description may be included in the DRB configuration procedure. Here, the procedure in FIG. 12 will be described with reference to the RRC reconfiguration message in FIG. 14 as an example, but a structure and name of a message or information element are not limited thereto.

The processing unit 502 in the UE 122 releases the PDCP entity associated with the value of the DRB identity included in DRB-ToReleaseList that is part of the current UE 122 configuration, releases the PDCP entity associated with the value of the DRB identity to be released as a result of the full configuration, and proceeds to step S1202 (step S1201).

In a case that the RRC reconfiguration message including the DRB-ToReleaseList in step S1201 does not include information indicating a release notification (e.g., release indication information element: releaseIndication), the processing unit 502 in the UE 122 terminates the DRB configuration (release of the DRB) process on the DRB. At this time, the DRB identity may be released. In a case that the RRC reconfiguration message including the DRB-ToReleaseList in step S1201 includes information indicating the release notification (e.g., release indication information element: releaseIndication), the processing unit 502 in the UE 122 proceeds to step S1203 (step S1202).

Alternatively, in step S1202, in a case that an EPS bearer identity configured for an identifier of the DRB included in the DRB-ToReleaseList is the same as the EPS bearer identity notified from the LTE RRC entity of the UE 122, the processing unit 502 in the UE 122 may terminate the DRB configuration (release of the DRB) process on the DRB.

In a case that this procedure is triggered due to handover (RRC reconfiguration with synchronization), the processing unit 502 in the UE 122 indicates that the DRB identified by the DRB identity is released (DRB release information) and the EPS bearer identity of the released DRB to the higher layer of the UE 122 (e.g., Non-Access Stratum (NAS Layer)) after the handover (RRC reconfiguration with synchronization) succeeds, and then, terminates the DRB configuration (release of the DRB) process on the DRB. In a case that this procedure is not triggered due to handover (RRC reconfiguration with synchronization), the processing unit 502 in the UE 122 immediately indicates that the DRB identified by the DRB identity is released and the EPS bearer identity of the released DRB to the higher layer of the UE 122 (e.g., Non-Access Stratum (NAS Layer)), and then, terminates the DRB configuration (release of the DRB) process on the DRB (step S1203).

Note that the above description describes the example in which the information indicating the release notification (for example, release indication information element: releaseIndication) is included in DRB-ToRelease, but the information may be included in other information elements.

The information indicating the release notification (e.g., release indication information element: releaseIndication) may be Boolean type information, indicating that the release notification is indicated if true, or indicating that the release notification is not indicated if false. Alternatively, true and false may be reversed. The information indicating the release notification (e.g., release indication information element: releaseIndication) may be Enumerated type information, indicating that the release notification is indicated in a case that the information is a first value, or indicating that the release notification is not indicated in a case that the information is a second value. The information indicating the release notification (e.g., release indication information element: releaseIndication) may indicate whether or not to indicate the release notification depending on whether or not first information is included in the RRC reconfiguration message. A case that the first information is included may indicate that the release notification is indicated, and a case that the first information is not included may indicate that the release notification is not indicated. Alternatively, whether or not the first information is included may be reversed. The information indicating the release notification (e.g., release indication information element: releaseIndication) may be other types.

Another example of the DRB configuration procedure will be described using FIGS. 5 to 8, FIG. 13, and FIG. 14. Here, a process in a case that the UE 122 receives information indicating that the DRB is added and/or modified (e.g., DRB-ToAddModList) will be described. Here, the procedure in FIG. 13 will be described with reference to the RRC reconfiguration message in FIG. 14 as an example, but a structure and name of a message or information element are not limited thereto.

The processing unit 502 in the UE 122 performs the following processes on the value of the DRB identity included in DRB-ToAddModList that is not part of the current UE 122 configuration.

The processing unit 502 in the UE 122 establishes a PDCP entity and configures the PDCP entity according to the received pdcp-Config. A security algorithm is configured for the PDCP entity according to a configuration for security (securityConfig). Keys associated with KeNB or KgNB indicated by information of the key to be used (keyToUse) are applied, and the process proceeds to step S1302 (step S1301).

In step S1302, in a case that the fullConfig information element is included in the RRC reconfiguration message, or an information element indicating association (e.g., association indication information element: associateIndication) is included in the RRC reconfiguration message, the processing unit 502 in the UE 122 proceeds to step S1303 and otherwise to step S1304 (step S1302).

Alternatively, in step S1302, in a case that the fullConfig information element is included in the RRC reconfiguration message, or the EPS bearer identity notified from LTE RRC entity of the UE 122 is the same as the EPS bearer identity configured for the DRB included in the DRB-ToAddModList, the processing unit 502 in the UE 122 may proceed to step S1303 and otherwise to step S1304.

In step S1303, the processing unit 502 in the UE 122 associates the established DRB with the EPS bearer identity included in the configuration of the DRB, and then, terminates the DRB configuration (addition and/or modification of the DRB) process on the DRB (step S1303).

In step S1304, the processing unit 502 in the UE 122 indicates that the DRB identified by the DRB identity is established and the EPS bearer identity of the established DRB to the higher layer of the UE 122 (e.g., Non-Access Stratum (NAS Layer)), and then, terminates the DRB configuration (addition and/or modification of the DRB) process on the DRB (step S1304).

Note that the above description describes the example in which the information element indicating association (e.g., association indication information element: associateIndication) is included in DRB-ToAddMod, but the information element may be included in other information elements.

The information element indicating association (e.g., association indication information element: associateIndication) may be Boolean type information, indicating that the association is indicated if true, or indicating that the association is not indicated if false. Alternatively, true and false may be reversed. The information element indicating association (e.g., association indication information element: associateIndication) may be Enumerated type information, indicating that the association is indicated in a case that the information is a first value, or indicating that the association is not indicated in a case that the information is a second value. The information element indicating association (e.g., association indication information element: associateIndication) may indicate whether or not to indicate the association depending on whether or not first information is included in the RRC reconfiguration message. A case that the first information is included may indicate that the association is indicated, and a case that the first information is not included may indicate that the association is not indicated. Alternatively, whether or not the first information is included may be reversed. The information element indicating association (e.g., association indication information element: associateIndication) may be other types. The process may consider "indicating that the association is indicated" as "indicating that a full configuration is performed."

Another example of the DRB configuration procedure will be described using FIGS. 5 to 8, FIG. 15, and FIG. 16. Here, a process in a case that the UE 122 receives information indicating that the DRB is released and added (e.g., DRB-ToReleaseAddList) will be described. Note that other processes not included in the following description may be included in the DRB configuration procedure. Here, the procedure in FIG. 12 will be described with reference to the RRC reconfiguration message in FIG. 16 as an example, but a structure and name of a message or information element are not limited thereto.

The processing unit 502 in the UE 122 releases the PDCP entity associated with the value of the DRB identity included in DRB-ToReleaseAddList that is part of the current UE 122 configuration, and the DRB identity, and proceeds to step S1502 (step S1501).

In step S1502, the processing unit 502 in the UE 122 establishes a PDCP entity for the value of the DRB identity that is included in DRB-ToReleaeAddList and is not part of the UE 122 configuration and configures the PDCP entity according to the received pdcp-Config. A security algorithm is configured for the PDCP entity according to a configuration for security (securityConfig). Keys associated with KeNB or KgNB indicated by information of the key to be used (keyToUse) are applied. Then, the established DRB is associated with the EPS bearer identity corresponding to the DRB, and, the DRB configuration (release and/or addition of the DRB) process is terminated.

Note that the above description describes the example in which DRB-ToReleaseAddList is included in the RadioBearerConfig information element of the RRC reconfiguration message, but DRB-ToReleaseAddList may be included in other information elements.

The base station apparatus (eNB 102, gNB 108) generates an RRC reconfiguration message including the DRB configuration as described above and transmits the generated message to the UE 122. The base station apparatus (eNB 102, gNB 108) assumes that the UE 122 performs the process based on the information included in the DRB configuration by receiving the RRC reconfiguration message. In other words, the base station apparatus (eNB 102, gNB 108) transmits the RRC reconfiguration message to cause the UE 122 to select the process necessary for configuring the DRB for the UE 122.

The above description "a PDCP entity is established" may be replaced with "a PDCP entity is established by NR." The description "a PDCP entity is established" may indicate a case that establishment of a PDCP entity is established in an NR RRC entity. The description "a PDCP entity associated with a value of a DRB identity" may be to indicate an NR PDCP entity associated with a DRB identity included in a DRB configuration of an NR RRC entity.

In the above description, the higher layer of the UE 122 may be a Non-Access Stratum (NAS Layer). In other words, in the UE 122, the processing unit 502 is a processing unit configured to process the signal of the RRC layer that is an access layer (Access Stratum: AS Layer), and may exchange various signals with a non-access stratum serving as a higher layer.

As described above, according to the embodiment of the present invention, the base station apparatus (eNB 102, gNB 108) can notify the terminal apparatus (UE 122) of the information required for the DRB configuration and the terminal apparatus (UE 122) can correctly perform the DRB configuration, allowing efficient communication.

Note that the DRB configuration according to the embodiment of the present invention may be included in an RRC Establishment procedure and an RRC Re-Establishment procedure, in addition to the RRC connection reconfiguration procedure.

Moreover, some or all of the information elements and procedures used in the example of each embodiment described above may be used in combination with some or all of the information elements or procedures used in the examples of other embodiments.

Various aspects of the terminal apparatus 2 and the base station apparatus 3 according to the embodiment of the present invention will be described.

(1) A first aspect of the present invention is a terminal apparatus including a receiver configured to receive a message for releasing a data radio bearer (DRB), and a processing unit configured to notify to a NAS layer that the DRB indicated by the message is released and an EPS bearer identity of the released DRB in a case that the message does not include first information, and not to notify to the NAS layer that the DRB indicated by the message is released and an EPS bearer identity of the released DRB in a case that the message includes the first information.

(2) In the first aspect of the present invention, the first information indicates that the message is a PDCP layer version change.

(3) In the first aspect of the present invention, the first information is information indicating that the NAS layer is not notified that the DRB indicated by the message is released and is not notified of the EPS bearer identity of the released DRB.

(4) A second aspect of the present invention is a base station apparatus for communicating with a terminal apparatus, the base station apparatus including a transmitter configured to transmit a message for releasing a data radio bearer (DRB), and a processing unit configured to include first information in the message, the first information indicating whether or not a NAS layer of the terminal apparatus is notified that the DRB indicated by the message is released and is notified of an EPS bearer identity of the released DRB.

(5) A third aspect of the present invention is a communication method applied to a terminal apparatus, the communication method including the steps of receiving a message for releasing a data radio bearer (DRB), and notifying to a NAS layer that the DRB indicated by the message is released and an EPS bearer identity of the released DRB in a case that the message does not include first information and not notifying to the NAS layer that the DRB indicated by the message is released and an EPS bearer identity of the released DRB in a case that the message includes the first information.

(6) A fourth aspect of the present invention is a communication method applied to a base station apparatus for communicating with a terminal apparatus, the communication method including the steps of transmitting a message for releasing a data radio bearer (DRB), and including first information in the message, the first information indicating whether or not a NAS layer of the terminal apparatus is notified that the DRB indicated by the message is released and is notified of an EPS bearer identity of the released DRB.

(7) A fifth aspect of the present invention is an integrated circuit mounted on a terminal apparatus, the integrated circuit causing the terminal apparatus to exert functions to receive a message for releasing a data radio bearer (DRB), and notify to a NAS layer that the DRB indicated by the message is released and an EPS bearer identity of the released DRB in a case that the message does not include first information and not notify to the NAS layer that the DRB indicated by the message is released and an EPS bearer identity of the released DRB in a case that the message includes the first information.

(8) A sixth aspect of the present invention is an integrated circuit mounted on a base station apparatus for communicating with a terminal apparatus, the integrated circuit causing the base station apparatus to exert functions to transmit a message for releasing a data radio bearer (DRB), and include first information in the message, the first information indicating whether or not a NAS layer of the terminal apparatus is notified that the DRB indicated by the message is released and is notified of an EPS bearer identity of the released DRB.

(9) A seventh aspect of the present invention is a terminal apparatus including a receiver configured to receive any of a first message and a second message as a message for indicating release of a radio bearer, and a processing unit configured to notify to a NAS layer that the DRB indicated by the message is released and an EPS bearer identity of the released DRB in a case of receiving the first message, and not notify to the NAS layer that the DRB indicated by the message is released and an EPS bearer identity of the released DRB in a case of receiving the second message.

(10) An eighth aspect of the present invention is a base station apparatus for communicating with a terminal apparatus, the base station apparatus including a transmitter configured to transmit any of a first message and a second message as a message for indicating release of a radio bearer, and a processing unit configured to generate the first message as a message for notifying to a NAS layer of the terminal apparatus that the DRB indicated by the message is released and an EPS bearer identity of the released DRB, and generate the second message as a message for not notifying to the NAS layer of the terminal apparatus that the DRB indicated by the message is released and an EPS bearer identity of the released DRB.

(11) A ninth aspect of the present invention is a communication method applied to a terminal apparatus, the communication method including the steps of receiving any of a first message and a second message as a message for indicating release of a radio bearer, and notifying to a NAS layer that the DRB indicated by the message is released and an EPS bearer identity of the released DRB in a case of receiving the first message and not notifying to the NAS layer that the DRB indicated by the message is released and an EPS bearer identity of the released DRB in a case of receiving the second message.

(12) A tenth aspect of the present invention is a communication method applied to a base station apparatus for communicating with a terminal apparatus, the communication method including the steps of generating a first message as a message for notifying to a NAS layer of the terminal apparatus that the DRB indicated by a message is released and an EPS bearer identity of the released DRB and generating a second message as a message for not notifying to the NAS layer of the terminal apparatus that the DRB indicated by the message is released and an EPS bearer identity of the released DRB, and transmitting any of the first message and the second message as a message for indicating release of a radio bearer.

(13) An eleventh aspect of the present invention is an integrated circuit mounted on a terminal apparatus, the integrated circuit causing the terminal apparatus to exert functions to receive any of a first message and a second message as a message for indicating release of a radio bearer, and notify to a NAS layer that the DRB indicated by the message is released and an EPS bearer identity of the released DRB in a case of receiving the first message and not to notify to the NAS layer that the DRB indicated by the message is released and an EPS bearer identity of the released DRB in a case of receiving the second message.

(14) A twelfth aspect of the present invention is an integrated circuit mounted on a base station apparatus for communicating with a terminal apparatus, the integrated circuit causing the base station apparatus to exert functions to transmit any of a first message and a second message as a message for indicating release of a radio bearer, and generate the first message as a message for notifying to a NAS layer of the terminal apparatus that the DRB indicated by the message is released and an EPS bearer identity of the released DRB and generate the second message as a message for not notifying to the NAS layer of the terminal apparatus that the DRB indicated by the message is released and an EPS bearer identity of the released DRB.

(15) A thirteenth aspect of the present invention is a terminal apparatus including a first processing unit configured to receive information including a first message for indicating release of a radio bearer and a second message for adding a radio bearer, and a second processing unit configured to receive information including a third message for indicating release of a radio bearer, wherein in a case that identifiers of one or more DRBs included in the first message and the second message are the same, the first processing unit notifies the second processing unit of information of the identifiers of the one or more DRBs, and in a case that the third message includes an addition indication of a DRB of which an identifier is the same as the identifiers of the one or more DRBs notified by the first processing unit, the second processing unit does not notify to a higher layer that the DRB having the same identifier is released and an EPS bearer identity of the released DRB.

(16) In the thirteenth aspect of the present invention, in a case that the first message, the second message, and the third message are all notified through a message having an identical RRC transaction identifier, the higher layer is not notified that the DRB having the same identifier is released and is not notifies of the EPS bearer identity of the released DRB.

(17) A fourteenth aspect of the present invention is a terminal apparatus including a receiver configured to receive a message for adding a data radio bearer (DRB), and a processing unit configured to notify to a NAS layer that the DRB indicated by the message is established and an EPS bearer identity of the established DRB in a case that the message does not include first information, and not to notify to the NAS layer that the DRB indicated by the message is established and an EPS bearer identity of the established DRB in a case that the message includes the first information.

(18) In the fourteenth aspect of the present invention, in a case that the message includes the first information, the established DRB is associated with the EPS bearer identity.

(19) In the fourteenth aspect of the present invention, the first information indicates that the message is a PDCP layer version change.

(20) In the fourteenth aspect of the present invention, the first information is information indicating that the NAS layer is not notified that the DRB indicated by the message is established and is not notified of the EPS bearer identity of the established DRB.

(21) A fifteenth aspect of the present invention is a base station apparatus for communicating with a terminal apparatus, the base station apparatus including a transmitter configured to transmit a message for adding a data radio bearer (DRB), and a processing unit configured to include first information in the message, the first information indicating whether or not a NAS layer of the terminal apparatus is notified that the DRB indicated by the message is established and is notified of an EPS bearer identity of the established DRB.

(22) A sixteenth aspect of the present invention is a communication method applied to a terminal apparatus, the communication method including the steps of receiving a message for adding a data radio bearer (DRB), and notifying to a NAS layer that the DRB indicated by the message is established and an EPS bearer identity of the established DRB in a case that the message does not include first information and not notifying to the NAS layer that the DRB indicated by the message is established and an EPS bearer identity of the established DRB in a case that the message includes the first information.

(23) A seventeenth aspect of the present invention is a communication method applied to a base station apparatus for communicating with a terminal apparatus, the communication method including the steps of transmitting a message for adding a data radio bearer (DRB), and including first information in the message, the first information indicating whether or not a NAS layer of the terminal apparatus is notified that the DRB indicated by the message is established and is notified of an EPS bearer identity of the established DRB.

(24) An eighteenth aspect of the present invention is an integrated circuit mounted on a terminal apparatus, the integrated circuit causing the terminal apparatus to exert functions to receive a message for adding a data radio bearer (DRB), and notify to a NAS layer that the DRB indicated by the message is established and an EPS bearer identity of the established DRB in a case that the message does not include first information and not notify to the NAS layer that the DRB indicated by the message is established and an EPS bearer identity of the established DRB in a case that the message includes the first information.

(25) A nineteenth aspect of the present invention is an integrated circuit mounted on a base station apparatus for communicating with a terminal apparatus, the integrated circuit causing the base station apparatus to exert functions to transmit a message for adding a data radio bearer (DRB), and include first information in the message, the first information indicating whether or not a NAS layer of the terminal apparatus is notified that the DRB indicated by the message is established and is notified of an EPS bearer identity of the established DRB.

(26) A twentieth aspect of the present invention is a terminal apparatus including a receiver configured to receive any of a first message and a second message as a message for indicating addition of a radio bearer, and a processing unit configured to notify to a NAS layer that the DRB indicated by the message is established and an EPS bearer identity of the established DRB in a case of receiving the first message, and not notify to the NAS layer that the DRB indicated by the message is established and an EPS bearer identity of the established DRB in a case of receiving the second message.

(27) A twenty-first aspect of the present invention is a base station apparatus for communicating with a terminal apparatus, the base station apparatus including a transmitter configured to transmit any of a first message and a second message as a message for indicating addition of a radio bearer, and a processing unit configured to generate the first message as a message for notifying to a NAS layer of the terminal apparatus that the DRB indicated by the message is established and an EPS bearer identity of the established DRB, and generate the second message as a message for not notifying to the NAS layer of the terminal apparatus that the DRB indicated by the message is established and an EPS bearer identity of the established DRB.

(28) A twenty-second aspect of the present invention is a communication method applied to a terminal apparatus, the communication method including the steps of receiving any of a first message and a second message as a message for indicating addition of a radio bearer, and notifying to a NAS layer that the DRB indicated by the message is established and an EPS bearer identity of the established DRB in a case of receiving the first message and not notifying to the NAS layer that the DRB indicated by the message is established and an EPS bearer identity of the established DRB in a case of receiving the second message.

(29) A twenty-third aspect of the present invention is a communication method applied to a base station apparatus for communicating with a terminal apparatus, the communication method including the steps of generating a first message as a message for notifying to a NAS layer of the terminal apparatus that the DRB indicated by a message is established and an EPS bearer identity of the established DRB and generating a second message as a message for not notifying to the NAS layer of the terminal apparatus that the DRB indicated by the message is established and an EPS bearer identity of the established DRB, and transmitting any of the first message and the second message as a message for indicating addition of a radio bearer.

(30) A twenty-fourth aspect of the present invention is an integrated circuit mounted on a terminal apparatus, the integrated circuit causing the terminal apparatus to exert functions to receive any of a first message and a second message as a message for indicating addition of a radio bearer, and to notify to a NAS layer that the DRB indicated by the message is established and an EPS bearer identity of the established DRB in a case of receiving the first message and not to notify the NAS layer that the DRB indicated by the message is established and an EPS bearer identity of the established DRB in a case of receiving the second message.

(31) A twenty-fifth aspect of the present invention is an integrated circuit mounted on a base station apparatus for communicating with a terminal apparatus, the integrated circuit causing the base station apparatus to exert functions to transmit any of a first message and a second message as a message for indicating addition of a radio bearer, and generate the first message as a message for notifying to a NAS layer of the terminal apparatus that the DRB indicated by the message is established and an EPS bearer identity of the established DRB and generate the second message as a message for not notifying to the NAS layer of the terminal apparatus that the DRB indicated by the message is established and an EPS bearer identity of the established DRB.

(32) A twenty-sixth aspect of the present invention is a terminal apparatus including a first processing unit configured to receive information including a first message for indicating addition of a radio bearer and a second message for adding a radio bearer, and a second processing unit configured to receive information including a third message for indicating establishment of a radio bearer, wherein in a case that identifiers of one or more DRBs included in the first message and the second message are the same, the first processing unit notifies the second processing unit of information of the identifiers of the one or more DRBs, and in a case that the third message includes an addition indication of a DRB of which an identifier is the same as the identifiers of the one or more DRBs notified by the first processing unit, the second processing unit does not notify to a higher layer that the DRB having the same identifier is established and an EPS bearer identity of the established DRB.

(33) In the twenty-sixth aspect of the present invention, in a case that the first message, the second message, and the third message are all notified through a message having an identical RRC transaction identifier, the higher layer is not notified that the DRB having the same identifier is established and is not notified of the EPS bearer identity of the established DRB.

(34) A twenty-seventh aspect of the present invention is a terminal apparatus for communicating with one or multiple base station apparatuses, wherein the terminal apparatus receives an RRC reconfiguration message from the one or multiple base station apparatuses, and in a case that the RRC reconfiguration message includes a list of DRB identities of DRBs to be released, and the RRC reconfiguration message does not include information indicating a PDCP version change, the terminal apparatus notifies a higher layer of an EPS bearer identity corresponding to the DRB identity and DRB release information.

(35) A twenty-eighth aspect of the present invention is a terminal apparatus for communicating with one or multiple base station apparatuses, wherein the terminal apparatus receives an RRC reconfiguration message including a DRB configuration from the one or multiple base station apparatuses, and in a case that the DRB configuration includes a DRB identity and an EPS bearer identity, and the DRB identity is not part of the current configuration of the terminal apparatus, and that the RRC reconfiguration message includes information indicating a PDCP version change, the terminal apparatus associates a DRB established according to the DRB configuration with the EPS bearer identity.

(36) A twenty-ninth aspect of the present invention is a terminal apparatus for communicating with one or multiple base station apparatuses, wherein the terminal apparatus receives an RRC reconfiguration message from the one or multiple base station apparatuses, and in a case that the RRC reconfiguration message includes a list of DRB identities of DRBs to be released, and an indication for notifying release is set for the DRB identity, the terminal apparatus notifies a higher layer of an EPS bearer identity corresponding to the DRB identity and DRB release information.

(37) A thirtieth aspect of the present invention is a terminal apparatus for communicating with one or multiple base station apparatuses, wherein terminal apparatus receives an RRC reconfiguration message including a DRB configuration from the one or multiple base station apparatuses, and in a case that the DRB configuration includes a DRB identity and an EPS bearer identity, and the DRB identity is not part of the current configuration of the terminal apparatus, and that an association indication is set for the DRB configuration, the terminal apparatus associates a DRB established according to the DRB configuration with the EPS bearer identity.

(38) A thirty-first aspect of the present invention is a terminal apparatus for communicating with one or multiple base station apparatuses, wherein the terminal apparatus receives an RRC reconfiguration message from the one or multiple base station apparatuses, and in a case that the RRC reconfiguration message includes a DRB release and/or addition configuration, the DRB release and/or addition configuration includes a DRB identity, and the DRB identity is part of the current configuration of the terminal apparatus, the terminal apparatus releases a PDCP entity of a DRB corresponding to the DRB identity.

(39) A thirty-second aspect of the present invention is a terminal apparatus for communicating with one or multiple base station apparatuses, wherein the terminal apparatus receives an RRC reconfiguration message from the one or multiple base station apparatuses, and in a case that the RRC reconfiguration message includes a DRB release and/or addition configuration, the DRB release and/or addition configuration includes a DRB identity and an EPS bearer identity, and the DRB identity is not part of the current configuration of the terminal apparatus, the terminal apparatus establishes a PDCP entity according to a PDCP configuration included in the DRB release and/or addition configuration, configures the PDCP entity with a security configuration algorithm included in the DRB release and/or addition configuration, and associates a DRB established according to the DRB release and/or addition configuration with the EPS bearer identity.

(40) A thirty-third aspect of the present invention is a terminal apparatus for communicating with one or multiple base station apparatuses, wherein the terminal apparatus receives an RRC reconfiguration message from the base station apparatus, and in a case that the RRC reconfiguration message includes a list of DRB identities of DRBs to be released, and a notification about a new DRB establishment for an EPS bearer identity corresponding to the DRB identity is not received from an E-UTRA RRC entity, the terminal apparatus notifies a higher layer of the EPS bearer identity corresponding to the DRB identity and DRB release information.

(41) A thirty-fourth aspect of the present invention is a terminal apparatus for communicating with one or multiple base station apparatuses, wherein terminal apparatus receives an RRC reconfiguration message including a DRB configuration from the one or multiple base station apparatuses, and in a case that the DRB configuration includes a DRB identity and an EPS bearer identity, and the DRB identity is not part of the current configuration of the terminal apparatus, and that a notification about a new DRB establishment for the EPS bearer identity corresponding to the DRB identity is received from an E-UTRA RRC entity, the terminal apparatus associates a DRB established according to the DRB configuration with the EPS bearer identity.

As described above, according to the embodiment of the present invention, the base station apparatus (eNB 102, gNB 108) can notify the terminal apparatus (UE 122) of the information required for the DRB configuration and the terminal apparatus (UE 122) can correctly perform the DRB configuration, allowing efficient communication.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. Note that a carrier (frequency) of FDD may be referred to as a Paired carrier, and a carrier (frequency) of TDD may be referred to as an Unpaired carrier. In other words, FDD is synonymous with Paired, and TDD may be synonymous with Unpaired. The names of the parameters, events, and the like indicated in the embodiments are given for the sake of convenience of description; therefore, even in a case that the actual applied names differ from the names in the embodiments of the present invention, the spirit of the invention claimed in the embodiments of the present invention is not affected in any way.

The term "connection" used in the respective embodiments is not limited to the configuration in which a certain device and another device are directly connected using a physical line, and includes a configuration in which the devices are logically connected, a configuration in which the devices are wirelessly connected using the wireless technology, and the like.

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. The "computer system" herein refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be configured of a digital circuit, or may be configured of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Supplement

A terminal apparatus according to Aspect 1 of the present invention includes a receiver configured to receive a message for adding a data radio bearer (DRB) including information of an EPS bearer identity, and a processing unit configured to notify to a NAS layer that the DRB indicated by the message is established and an EPS bearer identity of the established DRB in a case that the message does not include first information, and not to notify to the NAS layer that the DRB indicated by the message is established and an EPS bearer identity of the established DRB in a case that the message includes the first information.

A terminal apparatus according to Aspect 2 of the present invention is configured such that, in Aspect 1, the first information, the message is a message of a PDCP version change.

A terminal apparatus according to Aspect 3 of the present invention is configured such that, in Aspect 1, the first information is information indicating that the EPS bearer identity of the established DRB is not notified to the NAS layer.

A terminal apparatus according to Aspect 4 of the present invention is configured such that, in Aspect 1, in a case that the message includes the first information, the established DRB is associated with the EPS bearer identity.

A base station apparatus according to Aspect 5 of the present invention is a base station apparatus for communicating with a terminal apparatus, the base station apparatus including a transmitter configured to transmit a message for adding a data radio bearer (DRB), and a processing unit configured to include first information in the message, the first information indicating whether or not a NAS layer of the terminal apparatus is notified that the DRB indicated by the message is established and is notified of an EPS bearer identity of the established DRB.

A communication method according to Aspect 6 of the present invention is a communication method applied to a terminal apparatus, the communication method including the steps of receiving a message for adding a data radio bearer (DRB) including information of an EPS bearer identity, and notifying to a NAS layer that the DRB indicated by the message is established and an EPS bearer identity of the established DRB in a case that the message does not include first information and not notifying to the NAS layer that the DRB indicated by the message is established and an EPS bearer identity of the established DRB in a case that the message includes the first information.

A communication method according to Aspect 7 of the present invention is a communication method applied to a base station apparatus for communicating with a terminal apparatus, the communication method including the steps of transmitting a message for adding a data radio bearer (DRB), and including first information in the message, the first information indicating whether or not a NAS layer of the terminal apparatus is notified that the DRB indicated by the message is established and is notified of an EPS bearer identity of the established DRB.

An integrated circuit according to Aspect 8 according to the present invention is an integrated circuit mounted on a terminal apparatus, the integrated circuit causing the terminal apparatus to exert functions to receive a message for adding a data radio bearer (DRB) including information of an EPS bearer identity, and to notify to a NAS layer that the DRB indicated by the message is established and an EPS bearer identity of the established DRB in a case that the message does not include first information and not to notify to the NAS layer that the DRB indicated by the message is established and an EPS bearer identity of the established DRB in a case that the message includes the first information.

An integrated circuit according to Aspect 9 of the present invention is an integrated circuit mounted on a base station apparatus for communicating with a terminal apparatus, the integrated circuit causing the base station apparatus to exert functions to transmit a message for adding a data radio bearer (DRB), and include first information in the message, the first information indicating whether or not a NAS layer of the terminal apparatus is notified that the DRB indicated by the message is established and is notified of an EPS bearer identity of the established DRB.

A terminal apparatus according to Aspect 10 of the present invention is a terminal apparatus for communicating with one or multiple base station apparatuses, the terminal apparatus including a receiver configured to receive a Radio Resource Control (RRC) reconfiguration message including a radio bearer configuration from a base station apparatus of the one ore multiple base station apparatuses, and a processing unit configured to perform a radio bearer modification process based on whether or not the radio bearer configuration includes information indicating a Packet Data Convergence Protocol (PDCP) version change.

A base station apparatus according to Aspect 11 of the present invention is a base station apparatus for communicating with a terminal apparatus, the base station apparatus including a generation unit configured to generate a Radio Resource Control (RRC) reconfiguration message including a radio bearer configuration, and a transmitter configured to transmit the RRC reconfiguration message to the terminal apparatus, wherein the RRC reconfiguration message is a message causing the terminal apparatus to perform a radio bearer modification process based on whether or not the radio bearer configuration includes information indicating a Packet Data Convergence Protocol (PDCP) version change.

A communication method according to Aspect 12 of the present invention is a communication method applied to a terminal apparatus for communicating with one or multiple base station apparatuses, the communication method including the steps of receiving a Radio Resource Control (RRC) reconfiguration message including a radio bearer configuration from a base station apparatus of the one or multiple base station apparatuses, and performing a radio bearer modification process based on whether or not the radio bearer configuration includes information indicating a Packet Data Convergence Protocol (PDCP) version change.

A communication method according to Aspect 13 of the present invention is a communication method applied to a base station apparatus for communicating with a terminal apparatus, the communication method including the steps of generating a Radio Resource Control (RRC) reconfiguration message including a radio bearer configuration, and transmitting the RRC reconfiguration message to the terminal apparatus, wherein the RRC reconfiguration message is a message causing the terminal apparatus to perform a radio bearer modification process based on whether or not the radio bearer configuration includes information indicating a Packet Data Convergence Protocol (PDCP) version change.

An integrated circuit according to Aspect 14 of the present invention is an integrated circuit mounted on a terminal apparatus for communicating with one or multiple base station apparatuses, the integrated circuit causing the terminal apparatus to perform receiving a Radio Resource Control (RRC) reconfiguration message including a radio bearer configuration from a base station apparatus of the one or multiple base station apparatuses, and performing a radio bearer modification process based on whether or not the radio bearer configuration includes information indicating a Packet Data Convergence Protocol (PDCP) version change.

An integrated circuit according to Aspect 15 of the present invention is an integrated circuit mounted on a base station apparatus for communicating with a terminal apparatus, the integrated circuit causing the base station apparatus to perform generating Radio Resource Control (RRC) reconfiguration message including a radio bearer configuration, and transmitting the RRC reconfiguration message to the terminal apparatus, wherein the RRC reconfiguration message is a message causing the terminal apparatus to perform a radio bearer modification process based on whether or not the radio bearer configuration includes information indicating a Packet Data Convergence Protocol (PDCP) version change.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application claims the benefit of priority to JP 2017-253554 filed on Dec. 28, 2017, which is incorporated herein by reference in its entirety.

REFERENCE SIGNS LIST

100 E-UTRA
102 eNB

104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
500 Receiver
502, 602 Processing unit
600 Transmitter

The invention claimed is:

1. A terminal apparatus for communicating with one or multiple base station apparatuses, the terminal apparatus comprising:
    a receiver configured to receive a Radio Resource Control (RRC) Reconfiguration message including a radio bearer configuration from a base station apparatus of the one or multiple base station apparatuses; and
    processing circuitry configured to perform, in an RRC Reconfiguration procedure, a radio bearer configuration process based on whether or not the radio bearer configuration includes information indicating a Packet Data Convergence Protocol (PDCP) version change, wherein the information indicates whether or not the PDCP version change is required for the radio bearer configuration process.

2. A base station apparatus for communicating with a terminal apparatus, the base station apparatus comprising:
    generation circuitry configured to generate a Radio Resource Control (RRC) Reconfiguration message including a radio bearer configuration; and
    a transmitter configured to transmit the RRC Reconfiguration message to the terminal apparatus, wherein the RRC Reconfiguration message is a message causing the terminal apparatus to perform, in an RRC Reconfiguration procedure, a radio bearer configuration process based on whether or not the radio bearer configuration includes information indicating a Packet Data Convergence Protocol (PDCP) version change, wherein the information indicates whether or not the PDCP version change is required for the radio bearer configuration process.

3. A communication method applied to a terminal apparatus for communicating with one or multiple base station apparatuses, the communication method comprising the steps of:
    receiving a Radio Resource Control (RRC) Reconfiguration message including a radio bearer configuration from a base station apparatus of the one or multiple base station apparatuses; and
    performing, in an RRC Reconfiguration procedure, a radio bearer configuration process based on whether or not the radio bearer configuration includes information indicating a Packet Data Convergence Protocol (PDCP) version change, wherein the information indicates whether or not the PDCP version change is required for the radio bearer configuration process.

4. A communication method applied to a base station apparatus for communicating with a terminal apparatus, the communication method comprising the steps of:
    generating a Radio Resource Control (RRC) Reconfiguration message including a radio bearer configuration; and
    transmitting the RRC Reconfiguration message to the terminal apparatus, wherein the RRC Reconfiguration message is a message causing the terminal apparatus to perform, in an RRC Reconfiguration procedure, a radio bearer configuration process based on whether or not the radio bearer configuration includes information indicating a Packet Data Convergence Protocol (PDCP) version change, wherein the information indicates whether or not the PDCP version change is required for the radio bearer configuration process.

* * * * *